US012456741B2

(12) United States Patent
Niroumand et al.

(10) Patent No.: US 12,456,741 B2
(45) Date of Patent: Oct. 28, 2025

(54) METHODS AND APPARATUS FOR END-OF-LINE TESTING OF FUEL CELL STACKS AND ELECTROLYZERS

(71) Applicant: Greenlight Innovation Corporation, Burnaby (CA)

(72) Inventors: Amir Masoud Niroumand, Agassiz (CA); Michael Hermann Eikerling, Cologne (DE); Hooman Homayouni, Vancouver (CA); Amin Nouri Khorasani, Burnaby (CA); Mark Randall Olfert, Delta (CA)

(73) Assignee: GREENLIGHT INNOVATION CORPORATION, Burnaby (CA)

( * ) Notice: Subject to any disclaimer, the term of this patent is extended or adjusted under 35 U.S.C. 154(b) by 180 days.

(21) Appl. No.: 18/035,948

(22) PCT Filed: Nov. 9, 2021

(86) PCT No.: PCT/CA2021/051594
§ 371 (c)(1),
(2) Date: May 9, 2023

(87) PCT Pub. No.: WO2022/099409
PCT Pub. Date: May 19, 2022

(65) Prior Publication Data
US 2023/0411655 A1    Dec. 21, 2023

Related U.S. Application Data

(60) Provisional application No. 63/111,760, filed on Nov. 10, 2020.

(51) Int. Cl.
*H01M 8/04664* (2016.01)
*C25B 15/023* (2021.01)
(Continued)

(52) U.S. Cl.
CPC ...... *H01M 8/04671* (2013.01); *G01R 31/378* (2019.01); *G01R 31/396* (2019.01);
(Continued)

(58) Field of Classification Search
CPC ......... H01M 8/04671; H01M 8/04007; H01M 8/04089; H01M 8/0438; H01M 8/0444;
(Continued)

(56) References Cited

U.S. PATENT DOCUMENTS 6,475,651 B1    11/2002    Wilkinson et al.
6,638,650 B1    10/2003    Bailey et al.
(Continued)

FOREIGN PATENT DOCUMENTS

CA          2 602 123        9/2005
WO       2006096956 A1       9/2006

OTHER PUBLICATIONS

Niroumand et al., "In-situ diagnostic tools for hydrogen transfer leak characterization in PEM fuel cell stacks Part I: R&D applications", Journal of Power Sources, 278 (2015), pp. 652-659.
(Continued)

*Primary Examiner* — Raul J Rios Russo
(74) *Attorney, Agent, or Firm* — Millen, White, Zelano & Branigan, P.C.; Christopher W. Brody

(57) ABSTRACT

The present invention relates to methods and apparatus that can be used for efficient end-of-line (EOL) testing of electrochemical stacks once they are assembled, and prior to break-in or operation of the stack. Rapid test methods and test methods that can be performed in parallel to detect different types of defects are described. Embodiments of the methods and apparatus can be used for testing PEM fuel cell stacks and electrolyzers.

20 Claims, 8 Drawing Sheets

(51) Int. Cl.
| | |
|---|---|
| *G01M 3/28* | (2006.01) |
| *G01R 31/378* | (2019.01) |
| *G01R 31/396* | (2019.01) |
| *H01M 8/04007* | (2016.01) |
| *H01M 8/04089* | (2016.01) |
| *H01M 8/0438* | (2016.01) |
| *H01M 8/0444* | (2016.01) |
| *H01M 8/04537* | (2016.01) |

(52) U.S. Cl.
CPC ... *H01M 8/04007* (2013.01); *H01M 8/04089* (2013.01); *H01M 8/0438* (2013.01); *H01M 8/0444* (2013.01); *H01M 8/04552* (2013.01); *C25B 15/023* (2021.01); *G01M 3/2815* (2013.01)

(58) Field of Classification Search
CPC ......... H01M 8/04552; H01M 8/04537; H01M 8/04664; H01M 8/1004; H01M 8/1018; G01R 31/378; G01R 31/396; G01M 3/2815; Y02E 60/50; Y02P 70/50; C25B 15/023
USPC ........................................................ 324/434
See application file for complete search history.

(56) References Cited

U.S. PATENT DOCUMENTS

| | | | |
|---|---|---|---|
| 6,798,221 | B2 | 9/2004 | Wang et al. |
| 6,889,147 | B2 | 5/2005 | Gopal et al. |
| 7,078,118 | B2 | 7/2006 | Schrooten et al. |
| 7,194,367 | B2 | 3/2007 | Baker |
| 7,597,977 | B2 | 10/2009 | Hamada et al. |
| 7,608,118 | B2 | 10/2009 | Anderson |
| 7,989,118 | B2 | 8/2011 | Bourgeoise et al. |
| 11,545,683 | B2 | 1/2023 | Niroumand et al. |
| 2004/0245100 | A1 | 12/2004 | Aboutallah |
| 2005/0064252 | A1 | 3/2005 | Kusakabe et al. |
| 2005/0237067 | A1 | 10/2005 | Haas et al. |
| 2006/0115693 | A1 | 6/2006 | Toth et al. |
| 2006/0166051 | A1 | 7/2006 | Murthy et al. |
| 2010/0186482 | A1* | 7/2010 | Bierl ............... F02D 41/0045 73/25.05 |
| 2012/0279277 | A1* | 11/2012 | Parusel ............. G01N 27/66 73/1.06 |
| 2013/0025349 | A1* | 1/2013 | Solomon ............ G01M 3/22 73/40.7 |
| 2013/0186180 | A1* | 7/2013 | Downing ............ G01M 3/226 73/40.7 |
| 2014/0045086 | A1 | 2/2014 | Choo et al. |
| 2014/0239962 | A1 | 8/2014 | Oda et al. |
| 2016/0116364 | A1* | 4/2016 | Vaccaro ............. G01M 3/229 73/40.7 |
| 2016/0282218 | A1* | 9/2016 | Orth .................. G01M 3/226 |
| 2018/0261858 | A1 | 9/2018 | Zhang et al. |
| 2020/0032849 | A1 | 1/2020 | Graf et al. |

OTHER PUBLICATIONS

Niroumand et al., "In-situ diagnostic tools for hydrogen transfer leak characterization in PEM fuel cell stacks part II: Operational applications", Journal of Power Sources, 322 (2016) pp. 147-154.

Niroumand et al., "In-situ diagnostics tools for hydrogen transfer leak characterization in PEM fuel cell stacks part III: Manufacturing applications", Journal of Power Sources, 448 (2020) 227359.

Taghiabadi et al., "Effect of MEA activation method on the long-term performance of PEM fuel cell", Applied Energy, 242 (2019) pp. 602-611.

Florida Solar Energy Center under DOE Contract, "Procedure for Performing PEM Single Cell Testing", Apr. 8, 2009.

Chen et al., "Modular, High-Volume Fuel Cell Leak-Test Suite and Process (Phase 1)", United States, 2012, https://doi.org/10.2172/1036158.

Yuan et al., "A review of accelerated conditioning for a polymer electrolyte membrane fuel cell", Journal of Power Sources 196 (2011), pp. 9097-9106.

Moor et al., "In-Situ Quantification of Electronic Short Circuits in PEM Fuel Cell Stacks", IEE Transactions on Industrial Electronics, nol. 62, No. 8, pp. 5275-5282, Aug. 2015.

Williams et al., "Analysis of Polarization Curves to Evaluate Polarization Sources in Hydrogen / Air PEM Fuel Cells", Journal of the Electrochemical Society, 152, (3), (2005).

Extended European Search Report dated May 12, 2025 issued in corresponding application 21890433.2.

Weizhong Lüet al: "The effects of pinholes on proton exchange membrane fuel cell performance"International Journal of Energy Research, Wiley, Chichester, GB, vol. 35, No. 1, Dec. 28, 2010, pp. 24-30.

Boaventura M et al: "Activation procedures characterization of MEA based on phosphoric acid doped PBI membranes", International Journal of Hydrogen Energy, Elsevier, Amsterdam, NL, vol. 35, No. 20, Oct. 1 2010, pp. 11649-11660.

* cited by examiner

METHODS AND APPARATUS FOR END-OF-LINE TESTING OF FUEL CELL STACKS AND ELECTROLYZERS

FIELD OF THE TECHNOLOGY

The present invention relates to methods and apparatus for testing of electrochemical stacks, such as fuel cell stacks and electrolyzer stacks. In some embodiments, the present invention relates to testing of PEM (polymer electrolyte membrane) fuel cell stacks after the fuel cell stack has been assembled or manufactured and prior to break-in or operation of the stack.

BACKGROUND

Electrochemical fuel cells convert reactants, namely fuel and oxidant, to generate electric power and reaction products. Electrochemical fuel cells generally employ an electrolyte disposed between two electrodes, namely a cathode and an anode. The electrodes each comprise a catalyst to induce the desired electrochemical reactions. Electrolyzer cells and electrolyzer stacks can have a similar structure to fuel cells and fuel cell stacks.

PEM fuel cells (also referred to as polymer electrolyte membrane or solid polymer fuel cells) employ a solid polymer electrolyte, or ion exchange membrane. The membrane is typically interposed between two electrodes, forming a membrane electrode assembly ("MEA"). Each electrode typically comprises an electrocatalyst layer adjacent the membrane, and a porous, electrically conductive gas diffusion layer. The membrane is typically proton-conductive and acts as a barrier for electrons and gases, isolating the electrons and preventing fuel and oxidant from crossing across the MEA from one electrode to the other. The MEA is typically interposed between two plates to form an individual fuel cell. The plates act as current collectors, provide support for the adjacent electrodes, and typically contain flow field channels for supplying reactants to the MEA, and in some cases for circulating a coolant. Fuel cell assemblies are typically compressed to ensure good electrical contact between the plates and the electrodes, as well as good sealing between fuel cell components. A plurality of fuel cells may be combined electrically in series to form a fuel cell stack. In a fuel cell stack, an electrically conductive plate may be shared between two adjacent fuel cell assemblies, in which case (as well as serving as a current collector) the plate also separates the fluid streams of the two adjacent fuel cell assemblies. Such plates are commonly referred to as bipolar plates and may have flow channels for directing fuel and oxidant on their outer surfaces, and coolant channels between the two surfaces.

The fuel stream which is supplied to the anode may be a gas such as, for example, substantially pure gaseous hydrogen or a reformate stream comprising hydrogen and other components, or a liquid such as, for example, aqueous methanol. The oxidant stream, which is supplied to the cathode, typically comprises oxygen supplied as, for example, substantially pure gaseous oxygen or a dilute oxygen stream, such as, for example, air, which may also contain other components such as nitrogen, argon, water vapor, carbon monoxide, and carbon dioxide. Various sealing mechanisms are used to fluidly isolate the fuel and oxidant streams from one another in the fuel cell stack.

Once an electrochemical stack is manufactured or assembled, typically several quality control tests are performed to check for issues such as material and/or manufacturing defects, and to check that the stack will perform as expected. This type of testing is often referred to as end-of-line testing (EOL testing), factory acceptance testing (FAT testing), or validation testing. It is typically conducted at the manufacturer's site prior to delivery of a product to a customer for installation and/or use. Such testing can help identify issues so that they can be corrected prior to shipment, or so that a faulty stack is not shipped.

Before a PEM fuel cell stack is supplied to a customer for use, it is typically subjected to a break-in procedure. Break-in is typically a lengthy process in which the fuel cell is operated for several hours at the beginning of life in order to establish high proton conductivity of the membrane electrolyte and high electrocatalytic activity of the catalyst layers. The membrane and catalyst structures are known to change permanently during this process, enhancing proton conduction and improving the electrochemical performance and the stability of the fuel cell. One example of a break-in procedure is voltage cycling between 0.3V and 0.6V. Another example is hydrogen pumping, which involves flowing hydrogen and nitrogen to the fuel cell stack and supplying current at a rate of about 200 mA/cm$^2$. Typically, some EOL fuel cell stack tests are performed prior to break-in. These include, for example, pneumatic or hydraulic internal and external leak testing. However, most EOL tests are performed after the break-in procedure has been completed. These include, for example, electrochemical testing such as polarization curve, high frequency resistance, and flow distribution tests.

Because the break-in procedure typically takes several hours, the need to perform break-in prior to completing certain EOL tests can slow down and add to the cost of manufacturing and quality control (QC) processes, and poses a significant hurdle in scaling up fuel cell stack production to commercially viable levels. Furthermore, EOL fuel cell stack tests are generally performed in series, one after the next, as shown for example in FIG. 1.

In the automotive industry, the performance of a conventional vehicle with an internal combustion engine can be EOL tested within minutes. This is done using a cold test, where the crank shaft is turned and some measurements are made in parallel. Although the engine is not running at its normal operating condition, the relationship between possible failures and this cold test condition is understood, characterized, and used to detect issues and failures. In some embodiments, the technology described herein provides a similar solution for fuel cell stack EOL testing, which can also be applied for testing electrolyzer stacks and other electrochemical stacks.

On-going research and development is significantly improving the cost, performance, and durability of fuel cell systems. Advancing from lab scale development towards production scale manufacturing requires important steps to be taken by the fuel cell industry, including (i) design modification of fuel cell systems to make them suitable for mass production; and (ii) development of manufacturing processes suitable for implementation in mass production; and (iii) the development of associated EOL test methods and apparatus for efficient testing of assembled fuel cell stacks.

SUMMARY OF THE TECHNOLOGY

In some embodiments of a method for end-of-line testing of a electrochemical stack, the stack comprises: a plurality of cell assemblies; an first inlet port, a first outlet port, and a first flow path passing through the plurality of cell assemblies and fluidly connecting the first inlet port to the first outlet port within the stack; and a second inlet port, a second outlet port and a second flow path passing through the plurality of cell assemblies and fluidly connecting the second inlet port to the second outlet port within the stack; and the method comprises: supplying a first gas stream to flow through the first flow path; supplying a second gas stream to flow through the second flow path, at least one of the first and second gas streams being an inert gas stream; measuring a first open circuit voltage across first gas stream and the second gas stream are flowing through the first and second flow paths, respectively; and comparing the measured first open circuit voltages with one another or with a reference voltage to identify which, if any, of the plurality of cell assemblies in the stack has a defect. The method can be performed before break-in of the stack, and/or before operation of the stack. The method can be used, for example, to detect internal leaks and/or electrical shorts within an electrochemical stack. In some embodiments, the stack further comprises a third inlet port, a third outlet port, and a third flow path passing through the plurality of cell assemblies and fluidly connecting the third inlet port to the third outlet port within the stack; and the method further comprises supplying a third gas stream to flow through the third flow path, wherein the third gas stream is different from said first and second gas streams. In some embodiments the first gas stream is supplied to flow through the first flow path at a first pressure, the second gas stream is supplied to flow through the second flow path at a second pressure, the first pressure greater than the second pressure, and the third gas stream is supplied to flow through the third flow path at a third pressure, wherein the third pressure is greater than the first pressure and the second pressure. In some embodiments the first, second and third pressures are all greater than an ambient pressure surrounding the stack, and the method further comprises, after measuring the first open circuit voltages, shutting off the first, second and third flow paths to contain their respective pressurized gas streams, and monitoring pressure in each of the flow paths over a period of time to detect if there is a leak from any of the flow paths. This can, for example, allow for external leak testing of the stack to be integrated with testing the stack for internal leaks and electrical shorts.

For example, in some embodiments, of a method for end-of-line testing of a fuel cell stack, the stack comprises: a plurality of fuel cell assemblies; an anode inlet port, an anode outlet port, and an anode flow path passing through the plurality of fuel cell assemblies and fluidly connecting the anode inlet port to the anode outlet port within the fuel cell stack; and a cathode inlet port, a cathode outlet port and a cathode flow path passing through the plurality of fuel cell assemblies and fluidly connecting the cathode inlet port to the cathode outlet port within the fuel cell stack; and the method comprises: supplying a hydrogen-containing gas stream to flow through the anode flow path; supplying an inert gas stream to flow through the cathode flow path; measuring a first open circuit voltage across each of the plurality of fuel cell assemblies in the fuel cell stack while the hydrogen-containing gas stream and the inert gas stream are flowing through the anode and cathode flow paths, respectively; and comparing the measured first open circuit voltages with one another or with a reference voltage to identify which, if any, of the plurality of fuel cell assemblies in the fuel cell stack has a defect. The method can be performed before break-in of the fuel cell stack, and/or before electrical power-producing operation of the fuel cell stack. The method can be used, for example, to detect internal leaks and/or electrical shorts within the fuel cell stack.

In some embodiments of the methods described herein, the hydrogen-containing gas stream is supplied to flow through the anode flow path at a first pressure, and the inert gas stream is supplied to flow through the cathode flow path at a second pressure, the first pressure greater than the second pressure.

In some embodiments of the methods described herein, the fuel cell stack further comprises a coolant inlet port, a coolant outlet port and a coolant flow path fluidly connecting the coolant inlet port to the coolant outlet port within the fuel cell stack, and the method further comprises supplying an oxygen-containing gas stream to flow through the coolant flow path. In some embodiments the hydrogen-containing gas stream is supplied to flow through the anode flow path at a first pressure, the inert gas stream is supplied to flow through the cathode flow path at a second pressure, the first pressure greater than the second pressure, and the oxygen-containing gas stream is supplied to flow through the coolant flow path at a third pressure, wherein the third pressure is greater than the first pressure and the second pressure. In some embodiments the first, second and third pressures are all greater than an ambient pressure surrounding the fuel cell stack, and the method further comprises, after measuring the first open circuit voltages, shutting off the anode, cathode and coolant flow paths to contain their respective pressurized gas streams, and monitoring pressure in each of the flow paths over a period of time to detect if there is a leak from any of the flow paths. Embodiments of such test methods can allow external leak testing of the stack to be integrated with testing the stack for internal leaks and electrical shorts.

In some embodiments of the methods described herein each of the gas streams supplied to the stack comprises helium and, at least at some point during the test method, each is gas stream is supplied to the stack at a pressure that is greater than an ambient pressure surrounding the stack, and the method further comprises testing for external leaks from the stack by monitoring an environment surrounding the stack for the presence of helium using a helium sensor. This allows the stack to be tested for external leaks at the same time as it is being tested for other defects.

For example, in some embodiments a hydrogen-containing gas stream also comprising helium is supplied to flow through a first flow path at a first pressure, an inert gas stream of helium or comprising helium is supplied to flow through a second flow path at a second pressure, the first pressure greater than the second pressure, and an oxygen-containing gas stream also comprising helium is supplied to flow through a third flow path at a third pressure, wherein the third pressure is greater than the first pressure and the second pressure, and the first, second and third pressures are all greater than an ambient pressure surrounding the stack, and the method further comprises testing for external leaks from the stack by monitoring an environment surrounding the stack for the presence of helium using a helium sensor.

In some embodiments a hydrogen-containing gas also comprising helium stream is supplied to flow through an anode flow path of a fuel cell stack at a first pressure, an inert gas stream of helium or comprising helium is supplied to a flow through a cathode flow path of a fuel cell stack at a second pressure, the first pressure greater than the second pressure, and an oxygen-containing gas stream also comprising helium is supplied to flow through a coolant flow path of a fuel cell stack at a third pressure, wherein the third pressure is greater than the first pressure and the second pressure, and the first, second and third pressures are all greater than an ambient pressure surrounding the fuel cell stack, and the method further comprises testing for external leaks from the fuel cell stack by monitoring an environment surrounding the stack for the presence of helium using a helium sensor.

In some embodiments, each of the hydrogen-containing gas stream, the inert gas stream and the oxygen-containing gas stream comprises helium, the first, second and third pressures are all greater than an ambient pressure surrounding the fuel cell stack, and the method further comprises testing for external leaks from the fuel cell stack by monitoring an environment surrounding the fuel cell stack for the presence of helium using a helium sensor. In some such embodiments, the hydrogen-containing gas stream is a hydrogen diluted in helium and, after measuring the first open circuit voltages, the method further comprises supplying the hydrogen-helium gas stream to flow through the anode flow path; supplying helium to flow through the cathode flow path; introducing oxygen into the helium flowing through the cathode flow path; while supplying the hydrogen-helium gas stream to flow through the anode flow path and gradually increasing a concentration of oxygen in the helium flowing through the cathode flow path, measuring a plurality of open circuit voltages across each of the plurality of fuel cell assemblies in the fuel cell stack to acquire an open-circuit-voltage-versus-cathode-oxygen-concentration profile for each of the plurality of fuel cell assemblies in the fuel cell stack; and comparing the open-circuit-voltage-versus-cathode-oxygen-concentration profiles with one another or with a reference profile to identify which, if any, of the plurality of fuel cell assemblies in the fuel cell stack has a defect. The method optionally includes also introducing a low concentration of hydrogen into the inert gas stream flowing through the cathode flow path while acquiring the open-circuit-voltage-versus-cathode-oxygen-concentration profiles. In some embodiments the method further comprises, after acquiring the open-circuit-voltage-versus-cathode-oxygen-concentration profiles: supplying a hydrogen-containing gas stream to flow through the cathode flow path; supplying an inert gas stream to flow through the anode flow path; introducing oxygen into the inert gas stream flowing through the anode flow path; while supplying the hydrogen-containing gas stream to flow through the cathode flow path and gradually increasing a concentration of oxygen in the inert gas stream flowing through the anode flow path, measuring a plurality of open circuit voltages across each of the plurality of fuel cell assemblies in the fuel cell stack to acquire an open-circuit-voltage-versus-anode-oxygen-concentration profile for each of the plurality of fuel cell assemblies in the fuel cell stack; and comparing the open-circuit-voltage-versus-anode-oxygen-concentration profiles with one another or with a reference profile to identify which, if any, of the plurality of fuel cell assemblies in the fuel cell stack has a defect Embodiments of such test methods can allow, for example, testing for internal leaks, electrical shorts, external leaks, as well as anode and cathode catalyst and/or flow sharing issues.

In other embodiments, of a method for end-of-line testing of a stack, the stack (such as a fuel cell stack or electrolyzer stack), comprises supplying a hydrogen-containing gas stream to flow through an anode flow path of the stack; supplying an inert gas stream to flow through a cathode flow path of the stack; introducing oxygen into the inert gas flowing through the cathode flow path; while supplying the hydrogen-containing gas stream to flow through the anode flow path and gradually increasing a concentration of oxygen in the inert gas flowing through the cathode flow path, measuring a plurality of open circuit voltages across each of a plurality of cell assemblies in the stack to acquire an open-circuit-voltage-versus-cathode-oxygen-concentration profile for each of the plurality of cell assemblies in the stack; and comparing the open-circuit-voltage-versus-cathode-oxygen-concentration profiles with one another or with a reference profile to identify which, if any, of the plurality of cell assemblies in the stack has a defect. The method optionally includes also introducing a low concentration of hydrogen into the inert gas stream flowing through the cathode flow path while acquiring the open-circuit-voltage-versus-cathode-oxygen-concentration profiles. In some embodiments, the method further comprises, after acquiring the open-circuit-voltage-versus-cathode-oxygen-concentration profiles: supplying a hydrogen-containing gas stream to flow through the cathode flow path; supplying an inert gas stream to flow through the anode flow path; introducing oxygen into the inert gas stream flowing through the anode flow path; while supplying the hydrogen-containing gas stream to flow through the cathode flow path and gradually increasing a concentration of oxygen in the inert gas stream flowing through the anode flow path, measuring a plurality of open circuit voltages across each of the plurality of cell assemblies in the stack to acquire an open-circuit-voltage-versus-anode-oxygen-concentration profile for each of the plurality of cell assemblies in the stack; and comparing the open-circuit-voltage-versus-anode-oxygen-concentration profiles with one another or with a reference profile to identify which, if any, of the plurality of cell assemblies in the stack has a defect Embodiments of such test methods can allow, for example, testing for catalyst and/or flow sharing issues on the anode and cathode side of the stack. This testing can optionally be combined or integrated with testing for other types of defects, for example using methods described herein.

Any of the above-described methods can further comprise performing a low voltage hydrogen-inert gas electrochemical impedance spectroscopy in which hydrogen and an inert gas are supplied to the anode and cathode flow paths, respectively, and a relatively small DC current is drawn superimposed by a small sinusoidal current. The voltage response is then measured for each cell.

In any of the above-described methods, unless otherwise indicated or specified, the inert gas can be selected from the group consisting of nitrogen, argon, and helium. In some embodiments, the inert gas is helium. In some embodiments, the inert gas is nitrogen.

In any of the above-described described methods, unless otherwise indicated or specified, the oxygen-containing gas stream can be selected from the group consisting of air, oxygen in an inert gas, or substantially pure oxygen. In some embodiments, the oxygen-containing gas stream is air. In some embodiments, the oxygen-containing gas stream comprises air. In some embodiments, the oxygen-containing gas stream is oxygen in helium.

In any of the above-described methods, unless otherwise indicated or specified the hydrogen-containing gas stream can be selected from the group consisting of substantially pure hydrogen, or hydrogen in an inert gas. In some embodiments, the hydrogen-containing gas stream is hydrogen diluted in nitrogen. In some embodiments, the hydrogen-containing gas stream is hydrogen diluted in helium.

Embodiments of the methods described above can be used in various combinations to performed efficient testing of electrochemical stacks in which the stack are tested for multiple defects at the same time.

Embodiments of the methods described above can be performed before break-in of an electrochemical stack. For testing fuel cell stacks, embodiments of the methods described above can be performed before break-in of the stack, and/or before electrical power-producing operation of the stack. For testing electrolyzer stacks, embodiments of the methods described above can be performed before break-in of the stack and/before operating the stack to convert hydrogen and oxygen to water.

In some embodiments of a test station for testing an electrochemical stack, the test station comprises: a gas supply subsystem comprising a hydrogen-containing gas supply, an inert gas supply, and an oxygen-containing gas supply; a cell voltage monitoring subsystem for measuring voltage across each of a first plurality of electrochemical cell assemblies; a controller, the controller communicatively coupled to the cell voltage monitoring subsystem and configured to control the cell voltage monitoring system, and communicatively coupled to the gas supply subsystem and configured to control supply of gases to an electrochemical stack from the gas supply subsystem.

In some embodiments of the test station the controller is configured to implement one or more of the methods for end-of-line testing of an electrochemical stack that are described above.

In some embodiments of the test station, the gas supply subsystem is configured: for selectively delivering unhumidified gas from the hydrogen-containing gas supply, the inert gas supply, and the oxygen-containing gas supply to a first stack supply line; for selectively delivering unhumidified gas from the hydrogen-containing gas supply, the inert gas supply, and the oxygen-containing gas supply to a second stack supply line; and for selectively delivering gas from the oxygen-containing gas supply to a third stack supply line, and optionally for delivering gas from the hydrogen-containing gas supply and/or the inert gas supply to a third stack supply line.

In some embodiments of the test station, the first stack supply line is for delivering unhumidified gas to a first flow path in an electrochemical stack, and the first stack supply line is fluidly connected to receive gas from the hydrogen-containing gas supply via a first flow control device, fluidly connected to receive gas from the inert gas supply via a second flow control device, and fluidly connected to receive gas from the oxygen-containing gas supply via a third flow control device. The second stack supply line is for delivering unhumidified gas to a second flow path in an electrochemical stack, and the second stack supply line is fluidly connected to receive gas from the hydrogen-containing gas supply via a fourth flow control device, fluidly connected to receive gas from the inert gas supply via a fifth flow control device, and fluidly connected to receive gas from the oxygen-containing gas supply via a sixth flow control device. The third stack supply line is for delivering gas to a third flow path in an electrochemical stack, and the third stack supply line is fluidly connected to receive gas from the oxygen-containing gas supply via a seventh flow control device, and is optionally connected to receive gas from the inert gas supply via an eighth flow control device, and/or from the hydrogen-containing gas supply via a ninth flow control device. In some embodiments, for example, the first stack supply line is for delivering gas to an anode flow path in an electrochemical stack, the second stack supply line is for delivering gas to a cathode flow path in an electrochemical stack, and the third stack supply line is for delivering gas to a coolant flow path in an electrochemical stack. The flow control device can be, for example, a mass flow controller, a regulator, an on/of valve, a valve or any other suitable device or combination of devices.

In some of the above test station embodiments, the test station does not comprise a humidifier for humidifying a gas. In some of the above test station embodiments, the test station does not comprise a gas cooling/heating circuit for controlling a temperature of an electrochemical stack. In some of the above test station embodiments, the test station does not comprise a mechanism for connecting an electrical load to the stack.

In some of the above test station embodiments, the test station comprises small load that can be connected across a stack, and may further comprise a mechanism for switching the polarity of the load.

Embodiments of the test stations described above can be used for testing fuel cell stacks and/or for testing electrolyzer stacks.

In some embodiments a supervisory control and data acquisition system is configured to implement one or more of the methods for end-of-line testing of an electrochemical stack that are described above.

In some embodiments a supervisory control and data acquisition system comprises: a cell voltage monitoring subsystem for measuring voltage across each of a plurality of fuel cell assemblies in a fuel cell stack, the fuel cell stack comprising an anode flow path and a cathode flow path; and a controller communicatively coupled to the cell voltage monitoring subsystem. The controller is configured to cause a hydrogen-containing gas stream to flow through the anode flow path, and to cause an inert gas stream to flow through the cathode flow path. The controller is further configured to cause the cell voltage monitoring subsystem to measure a first open circuit voltage across each of the plurality of fuel cell assemblies while the hydrogen-containing gas stream and the inert gas stream are flowing through the anode and cathode flow paths, respectively. The controller is further configured to compare the measured first open circuit voltages with one another or with a reference voltage to identify which, if any, of the plurality of fuel cell assemblies in the fuel cell stack has a defect. Such a defect can be, for example, an internal leak and/or an electrical short.

In some embodiments of the supervisory control and data acquisition system, the controller is further configured to cause the hydrogen-containing gas stream to flow through the anode flow path at a first pressure, to cause the inert gas stream to flow through the cathode flow path at a second pressure, the first pressure greater than the second pressure. The controller can be further configured to cause an oxygen-containing gas stream to flow through a coolant flow path of the stack at a third pressure, the third pressure greater than the first pressure and the second pressure. The controller can be configured to cause the cell voltage monitoring subsystem to measure the first open circuit voltages while the hydrogen-containing gas stream, the inert gas stream and the oxygen-containing gas stream are flowing through the anode, cathode and coolant flow paths, respectively.

In some embodiments of the supervisory control and data acquisition systems described above, after causing the cell voltage monitoring subsystem to measure the first open circuit voltages, the controller can cause a second hydrogen-containing gas stream to flow through the anode flow path, cause an inert gas stream to flow through the cathode flow path, and cause oxygen to be introduced into the inert gas stream flowing through the cathode flow path. It can also cause a concentration of oxygen in the inert gas stream flowing through the cathode flow path to increase and, while supplying the second hydrogen-containing gas stream to flow through the anode flow path and gradually increasing a concentration of oxygen in the inert gas stream flowing through the cathode flow path, it can cause the cell voltage monitoring subsystem to measure a plurality of open circuit voltages across each of the plurality of fuel cell assemblies in the fuel cell stack and cause the data acquisition system acquire an open-circuit-voltage-versus-cathode-oxygen-concentration profile for each of the plurality of fuel cell assemblies in the fuel cell stack, each the profile comprising the plurality of open circuit voltages for each the fuel cell assembly. It can then cause the data acquisition system to compare the open-circuit-voltage-versus-cathode-oxygen-concentration profiles with one another or with a reference profile to identify which, if any, of the plurality of fuel cell assemblies in the fuel cell stack has a defect.

In any of the above-described test stations and supervisory control and data acquisition systems the inert gas can be selected from the group consisting of nitrogen, argon, and helium. In some embodiments of the above-described test stations and supervisory control and data acquisition systems, the inert gas is helium. In some embodiments of the above-described test stations and supervisory control and data acquisition systems, the inert gas is nitrogen.

In any of the above-described test stations and supervisory control and data acquisition systems the oxygen-containing gas stream can be selected from the group consisting of air, oxygen in an inert gas, or substantially pure oxygen. In some embodiments of the above-described test stations and supervisory control and data acquisition systems, the oxygen-containing gas stream is air. In some embodiments of the above-described test stations and supervisory control and data acquisition systems, the oxygen-containing gas stream is oxygen in helium.

In any of the above-described test stations and supervisory control and data acquisition systems the hydrogen-containing gas stream can be selected from the group consisting of substantially pure hydrogen, or hydrogen in an inert gas. In some embodiments of the above-described test stations and supervisory control and data acquisition systems, the hydrogen-containing gas stream is hydrogen diluted in nitrogen. In some embodiments of the above-described test stations and supervisory control and data acquisition systems, the hydrogen-containing gas stream is hydrogen diluted in helium.

This summary does not necessarily describe the entire scope of all aspects. Other aspects, features, and advantages will be apparent to those of ordinary skill in the art upon review of the description herein.

BRIEF DESCRIPTION OF THE DRAWINGS

FIG. 1 is a flow chart illustrating a conventional EOL test procedure for an electrochemical stack, which includes various tests performed in series both before and after break-in.

FIG. 3 is a flow chart illustrating an embodiment of a method that can be used to detect electrical short circuits in fuel cell stacks prior to break-in.

FIG. 5A is a flow chart illustrating an embodiment of a method that can be used to rapidly detect and locate multiple defects in fuel cell stacks at EOL and prior to break-in.

FIG. 5B is a flow chart illustrating another embodiment of a method that can be used to rapidly detect and locate multiple defects in fuel cell stacks at EOL and prior to break-in.

DETAILED DESCRIPTION OF PREFERRED EMBODIMENT(S)

Figure 1:
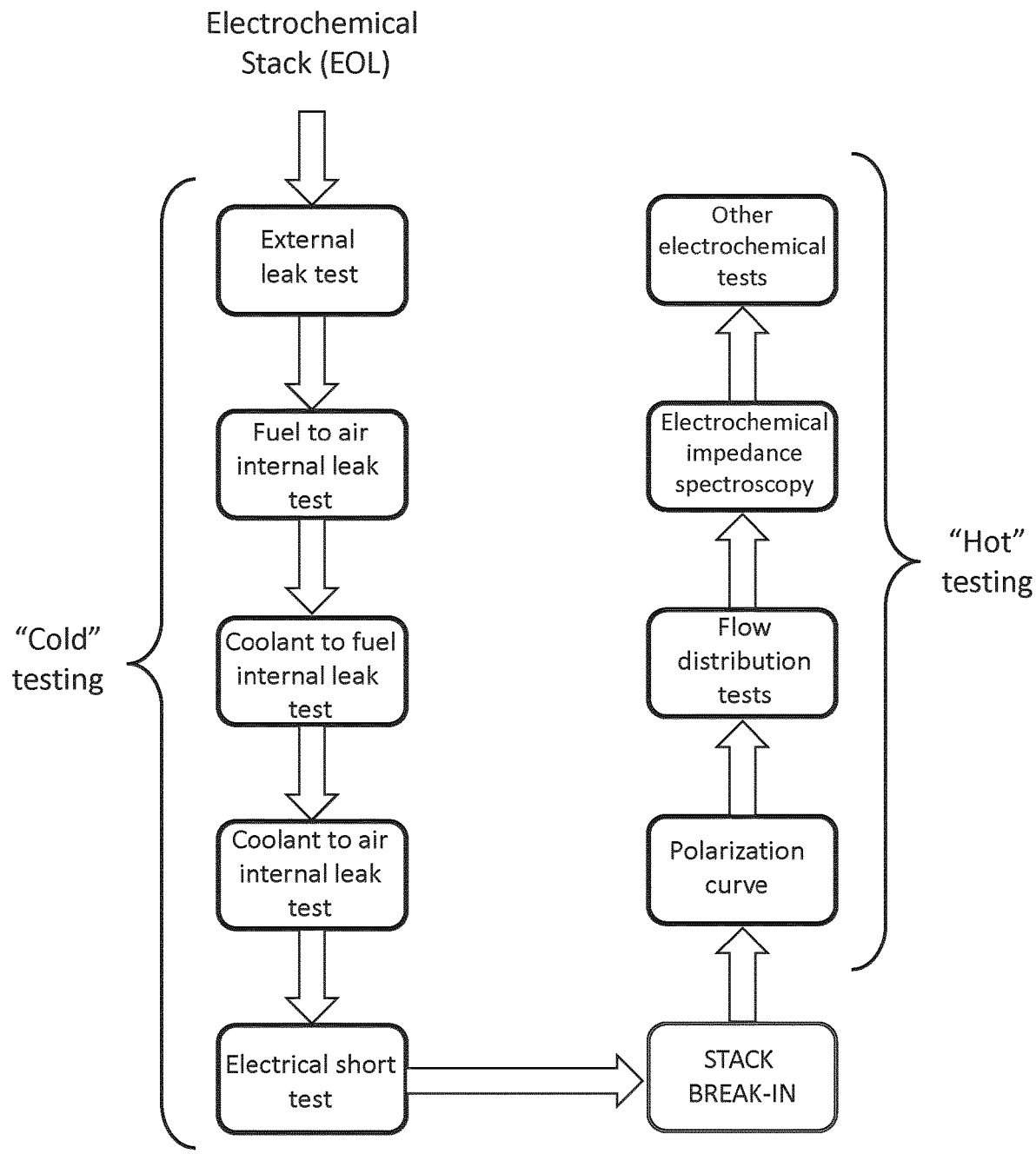

The present technology relates to test methods and apparatus that can be used in rapid end-of-line (EOL) fuel cell stack testing prior to performing fuel cell stack break-in. Some embodiments of the methods allow testing for a number of different problems or failure types simultaneously, as opposed to conducting a sequence of tests in series as is typically done. Furthermore, embodiments of the EOL tests described herein are faster compared to the ones used typically used after break-in, generally taking just a few minutes. These test methods include electrochemical test methods that can be applied to a fuel cell stack (not just an individual fuel cell).

Some embodiments of the EOL test methods are similar to known tests that are typically performed after break-in, but they are performed prior to break-in and under different conditions than usual. For example, in some embodiments such tests may be performed:

at ambient temperature (e.g. about 25° C. and/or without temperature regulation or control), rather than at a typical fuel cell stack operating temperature (e.g. about 80° C.); and/or without humidification of the gas streams delivered to the anodes and/or cathodes; and/or without supply of fuel, oxidant, and coolant to the fuel cell stack; and/or using non-conventional gases and gas mixtures; and/or without an electrical load being connected to receive power from the fuel cell stack; and/or without the need to draw current or sweep fuel cell voltage.

In some embodiments, the EOL test methods are new methods that are different from existing fuel cell stack test methods.

Embodiments of the test methods described herein are intended to provide a fuel cell stack manufacturer with a rapid and reliable good/bad indicator for the fuel cell stack (and/or any associated or integrated systems). In some embodiments, the test results can be used to predict operational performance of a fuel cell stack/system before break-in has been carried out.

For conventional dynamic fuel cell stack electrochemical testing, such as generating polarization curves and performing electrochemical impedance spectroscopy (EIS) after break-in, the fuel cell stack is supplied with fuel to the anodes and oxidant to the cathodes, and is typically set at a certain operating point to deliver electrical power and a voltage response is recorded. This response is a result of the transport phenomena and other phenomena that are happening in the cell, and is used to characterize these processes and relate them to possible issues or failures.

However, in aspects of the pre-break-in testing approach described herein, the fuel cell stack is held at or close to an equilibrium potential to detect issues or problems with it. In most of the test methods, the fuel cell stack is supplied with hydrogen and nitrogen or helium, only open circuit voltages (OCVs) are measured, and there is no need to draw current or sweep voltage, making such methods suitable for stacks. For example, in some embodiments, the fuel cell stack anodes and cathodes are supplied with hydrogen and nitrogen, respectively, and some hydrogen generally diffuses through the membrane resulting in a low concentration of hydrogen at the cathode. This effectively results in a concentration cell, where the cell equilibrium potential is related to the hydrogen concentration gradient between the anode and the cathode with no current drawn. Changing conditions, such as concentration, over-pressure, pressure and/or gas mixture, can cause the OCVs of cells in the stack to change. A change in OCV of a cell with a change in test conditions, or an OCV that is an outlier (different to the OCVs of other cells) in the stack under the same conditions, can be used to detect and locate issues or problems with a fuel cell stack. As operating the stack under these conditions does not require a load current and consumption of species at any significant rates, it allows testing of the fuel cell stack prior to break-in.

Figure 2:
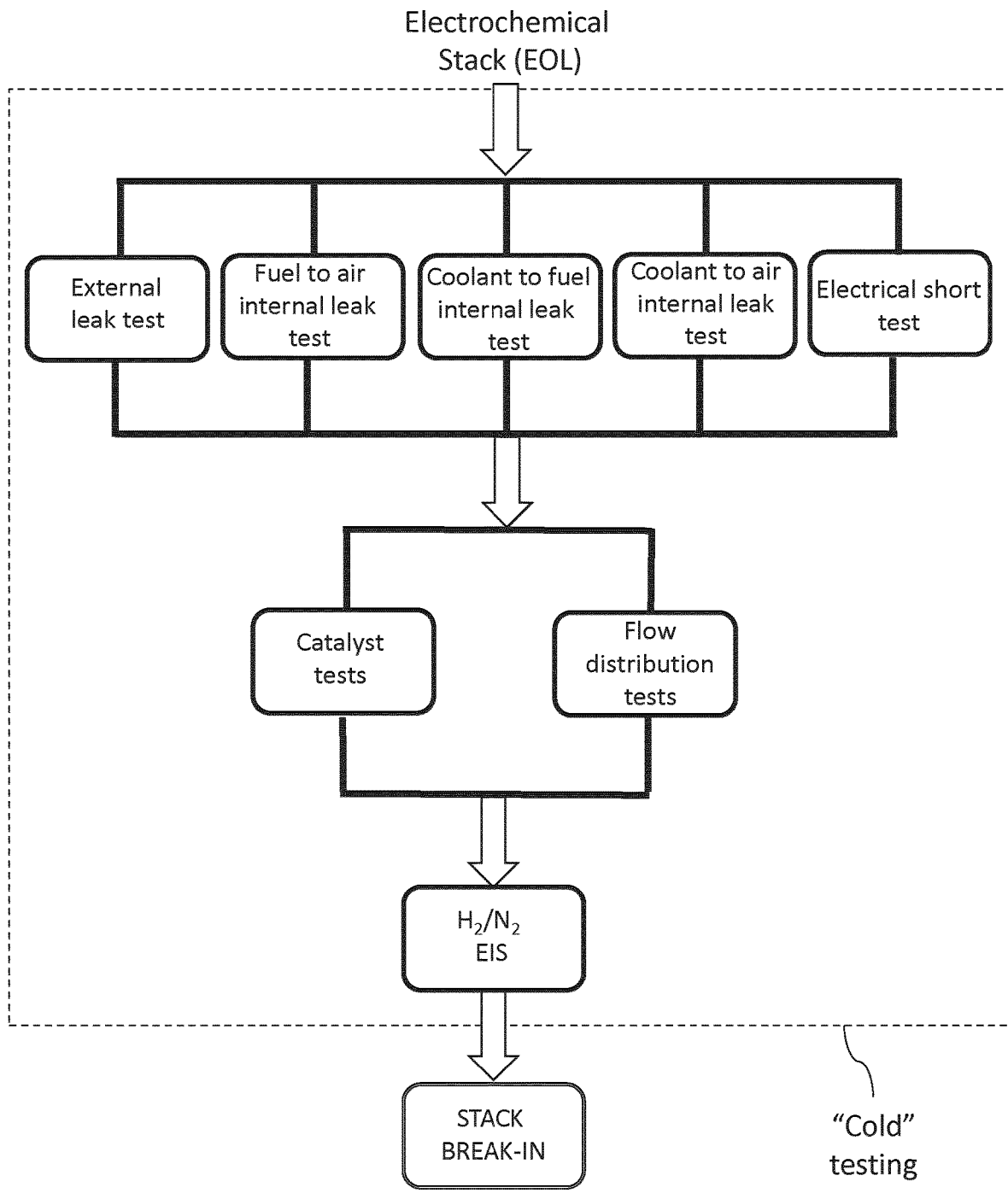
FIG. 2 is a flow chart illustrating an embodiment of a rapid EOL testing procedure that can be performed prior to break-in, with multiple tests performed in parallel.

Some of the pre-break-in tests described herein can be combined and run in parallel (or with slight adjustments to test conditions) to enable faster detection of failure modes during manufacturing of a fuel cell stack. FIG. 2 shows five types of tests being performed in parallel, and then another two types of testing being performed in parallel, all prior to break-in of the fuel stack, and without humidification, heating or power-producing operation of the fuel cell stack (such tests are sometimes referred to as "cold tests").

Some examples of EOL tests that can be performed prior to break-in are described in further detail below.

Internal Leak Testing

In some embodiments of methods that can be used to test for internal leaks in a fuel cell stack, hydrogen is supplied to the anode flow path and nitrogen (or another inert gas) is supplied to the cathode flow path at a lower pressure (i.e. so that there is an anode overpressure). If there is an internal leak path from anode to cathode (e.g. across the membrane) in any of the cells in the stack, the anode overpressure causes increased hydrogen crossover from anode to cathode in those cells. This crossover results in a reduced OCV for cells with an internal leak. So, for example, by measuring and comparing the cell OCVs under these test conditions (or comparing cell OCVs for individual cells with and without an anode overpressure), internal leaks can be detected and located in the stack.

In some embodiments of methods that can be used to test for internal leaks in a fuel cell stack, again hydrogen is supplied to the anode flow path and nitrogen is supplied to the cathode flow path. The coolant flow path is supplied with air (or oxygen) at a pressure above that of hydrogen supplied to the anode flow path and nitrogen supplied to cathode flow path. In this case, if there is a leak between the coolant flow path and the anode and/or cathode in any of the cells in the stack, the OCV of those cells will be different. More specifically, for example, a leak of air from the coolant flow path to the cathode in a cell typically causes the OCV for that cell to jump from about 100 mV to about 0.9V, and a leak of air from the coolant flow path to the anode in a cell typically results in a drop in OCV from about 100 mV to a lower value.

Testing for Electrical Shorts

Manufacturing defects can result in low resistance points between pairs of electrodes or plates. This can occur, for example, if there are irregularities in the bipolar plates; if the electrode material penetrates the membrane electrolyte; if electrically conductive particles are introduced between the plates during stack assembly; and/or if edge-connection occurs between the bipolar plates. When a fuel cell with such an electrical short is supplied with reactants during a conventional break-in procedure, the voltage across the defect can cause a significant amount of current to pass through it and can result in a hot spot. The localized heat that is generated can burn and cause irreversible damage to the membrane and/or other fuel cell components, and result in fuel cell stack failure during break-in. Hence, it is beneficial to be able to detect electrical shorts during EOL testing prior to membrane break-in, so that fuel cells with electrical shorts can be removed from the fuel cell stack and replaced, for example.

When hydrogen and air are supplied to the anode and cathode of a PEM fuel cell, respectively, it results in an OCV of around ~1 V between the two electrodes and respective bipolar plates. If an electrical short circuit (low resistance path) exists between the two electrodes or bipolar plates, current will pass through it. If oxygen is present at the cathode, electron transfer from anode to cathode can cause an oxygen reduction reaction to occur at the cathode, between the oxygen and protons that have been conducted through the membrane. The magnitude of the current depends on the conductance of the electrical short circuit. If the current flowing is relatively high and is passing through a current path with a small surface area, it can result in a hotspot, and the heat that is generated can damage the membrane or MEA and cause the fuel cell to fail. In order to mitigate the risk of this occurring during testing for short circuits, it is desirable to reduce the cell potential so that the current is smaller, and less heat is produced. It is also desirable to use an inert gas on one side (typically the cathode side) in order to reduce the possibility of fuel and oxidant mixing if the short circuit does result in a transfer leak through the membrane.

Applicant has discovered that methods for detecting electrical short circuits in fuel cell stacks (such as methods described in Applicant's U.S. Patent Application Publication No. 2020/0328439A1, which is herein incorporated by reference in its entirety), can be performed prior to break-in.

In some embodiments of methods for detecting an electrical short circuit in a fuel cell stack during EOL testing, hydrogen and nitrogen (or another inert gas) are supplied to the anode and cathode flow paths, respectively, and the individual cell OCVs are measured. This approach typically reduces the OCV by an order of magnitude, relative to when hydrogen and air are supplied, and eliminates the use of oxygen from the testing procedure. If there is substantially no oxygen present at the cathode, an electrical short circuit can result in some hydrogen production at the cathode: protons that have passed through the membrane electrolyte can recombine with electrons that have been conducted via the electrical short circuit to produce hydrogen at the cathode. When hydrogen and nitrogen are supplied to the anode and cathode sides of a plurality of fuel cells, fuel cells that have one or more electrical short circuits, under certain conditions, have a lower OCV relative to similar or identical cells that have substantially no electrical short circuit across them.

Furthermore, as the concentration of hydrogen supplied to the anode is reduced, the effect of an electrical short circuit on fuel cell OCV is magnified. This allows the sensitivity of the test method to be adjusted. For example, the hydrogen concentration can be selected so that an electrical short circuit having a conductance at or above a desired threshold value can be detected for a given MEA, fuel cell architecture, and active area.

The sensitivity of the test method to reveal or identify a short circuit can depend at least in part on the size of the fuel cell active area as well as on the conductance (or resistance) of the electrical short circuit(s). When short circuits with lower conductance (higher resistance) or short circuits for fuel cells with a large active area need to be detected, the method can be made more sensitive by reducing the concentration of hydrogen supplied to the anode side. This can be accomplished, for example, by diluting the hydrogen with nitrogen.

Figure 3:
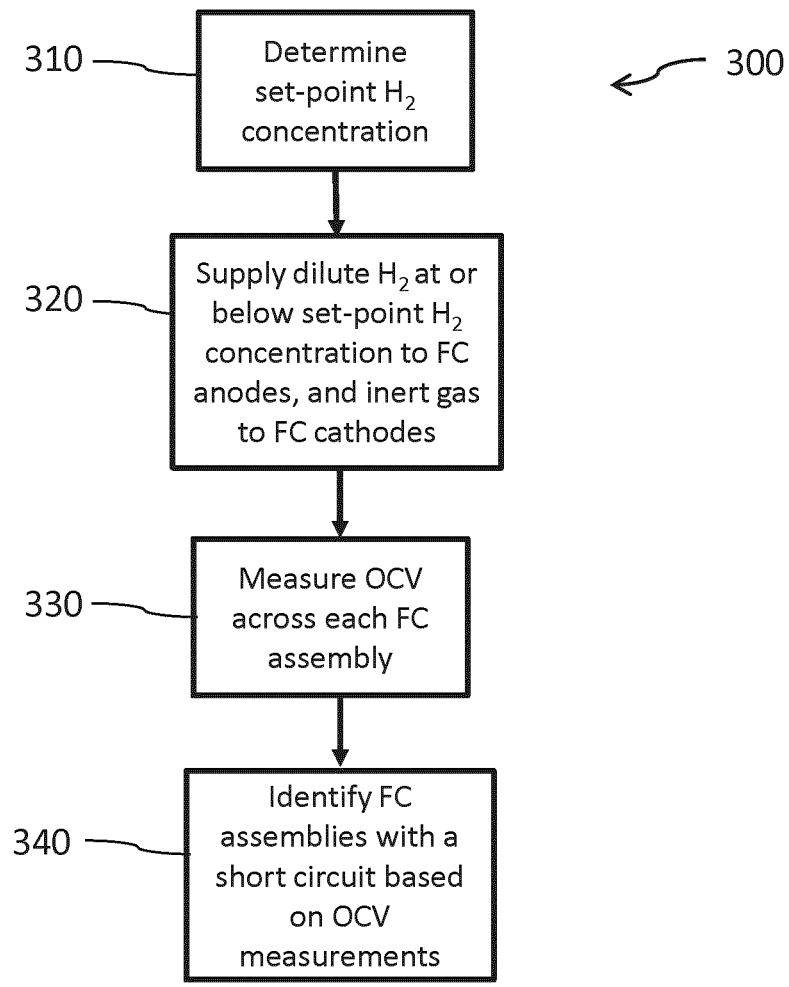

FIG. 3 is a flow chart illustrating an embodiment of a method 300 that can be used to detect electrical short circuits in a fuel cell stack comprising a plurality of fuel cell assemblies. Generally, the fuel cell assemblies are electrically connected in series. The sensitivity of the method to detect electrical short circuits is adjustable. In particular, the concentration of a dilute hydrogen stream used in the method can be selected so that electrical short circuits having a resistance at or below a desired threshold value can be detected using the method.

Block 310 of method 300 comprises determining a set-point hydrogen concentration. This is a hydrogen concentration that can be used to detect an electrical short circuit having a resistance at or below the desired detectable threshold short-circuit resistance value. In some embodiments of method 300, block 310 is optional. For example, if a set-point hydrogen concentration has been previously determined and/or is already known, block 310 may be omitted, or may involve simply providing or selecting a suitable set-point hydrogen concentration, for example, based on the type of fuel cell assemblies that are to be tested and the desired detectable threshold short-circuit resistance value.

Block 320 of method 300 comprises supplying a dilute hydrogen stream (e.g. diluted with nitrogen or another inert gas) having a hydrogen concentration at or below the set-point reactant concentration to flow through the anode flow path in the fuel cell stack, and supplying nitrogen (or another inert gas) to flow through the cathode flow path of the fuel cell stack. Block 330 of method 300 comprises waiting until the voltages stabilize, and then measuring the open circuit voltage across each of the plurality of fuel cell assemblies while the dilute hydrogen stream, having a hydrogen concentration at or below the set-point concentration, and the inert gas are flowing through the plurality of fuel cell assemblies. Block 340 of method 300 comprises identifying any fuel cell assemblies of the plurality of fuel cell assemblies that have an electrical short circuit based on the OCV measurements from block 330

External Leak Testing

In some embodiments of methods that can be used to test for external leaks from a fuel cell stack, the anode, cathode and coolant flow paths of the fuel cell stack can be pressurized with gas and sealed, for example using shutoff valves. External leaks can be detected by observing the rate of pressure drop in the flow paths. This pressure testing can be done in conjunction with other testing during which pressurized gases (e.g. hydrogen, nitrogen and air) are supplied to the anode, cathode and coolant flow paths, such as the internal leak testing described above.

Alternatively, helium can be used instead of nitrogen in the flow paths during EOL stack testing with the pressures in the flow paths higher than the ambient pressure, and a helium sensor can be used in the environment surrounding the stack to detect external leaks at the same time as other EOL testing is being performed, without the need to use shutoff valves. This approach can reduce the time taken for external leak testing. In some embodiments, the stack is placed in an enclosure during EOL testing, along with a helium sensor and a fan, so that any helium escaping from the stack is more readily detectable.

In other embodiments of methods that can be used for internal leak testing, testing for electrical shorts, and/or external leak testing, the combinations of gases supplied to the various flow paths can be different from those described in the examples given above. For example, in some embodiments for internal leak testing, hydrogen, nitrogen and air can supplied to different flow paths than described above, or in some embodiments, oxygen, air and nitrogen can be supplied to the three flow paths. The choice may depend upon the types of catalyst that are present at the anode and cathode.

Hydrogen-Nitrogen Electrochemical Impedance Spectroscopy (EIS)

Conducting EIS under $H_2/N_2$ (or $H_2/He$) conditions, allows monitoring or assessment of proton conductivity and electrode conditions in the cells in a fuel cell stack. In this method, hydrogen and nitrogen are supplied to the anode and cathode flow paths, respectively. A relatively small DC current, e.g., 100 m $A/cm^2$, is drawn from the cell superimposed by a small sinusoidal current, e.g., 10 m $A/cm^2$ amplitude, at different frequencies over a range, e.g., 0.1 Hz to 10 kHz. The voltage response is then measured. The amplitude ratio and phase difference between the voltage and current indicates transport phenomenon from which structural properties can be inferred. This technique can be used to predict performance deficiencies after break-in and during subsequent fuel cell stack operation.

Test Methods Combining Fuel and Oxidant on the Same Electrode

Some embodiments of methods for EOL testing of fuel cell stack that can be performed prior to break-in involve supplying or allowing fuel and oxidant (e.g. hydrogen and oxygen) to be present at the same electrode. With this approach, an electrochemical reaction takes place on one electrode, and the other electrode effectively acts as reference electrode. The methods can be performed prior to break in, as they do not involve proton conduction through the membrane. Such methods can be used to detect problems with the catalyst in one or more cells of the stack. They can also be used to detect and locate other defects, such as flow distribution issues in the stack, for example where reactant access to the electrodes in one or more cells is impeded. These test methods can be performed at EOL, and can replace (or at least precede) longer duration tests that are normally performed post-break-in at normal stack operating temperatures (e.g. 80° C.) with humidified fuel and oxidant supplied to the stack, and production of water.

Figure 4:
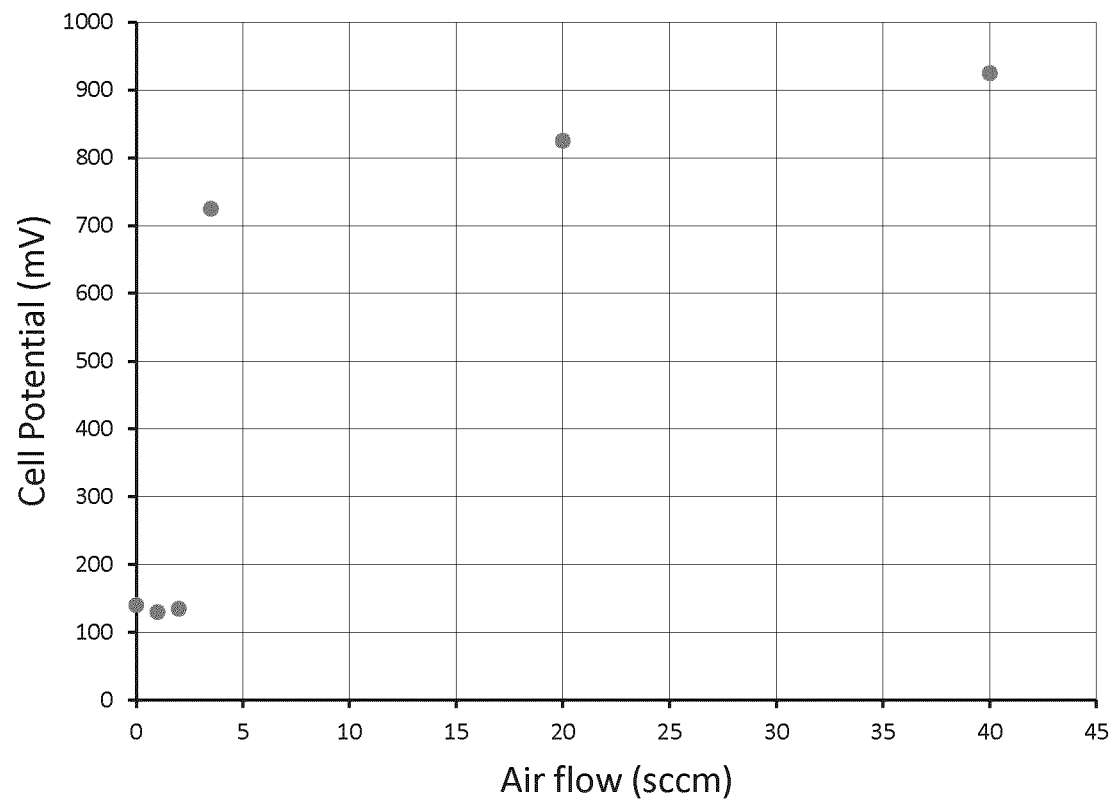
FIG. 4 is a graph showing cell potential as a function of air flow rate supplied to the cathode in a fuel cell in which hydrogen is supplied to the anode and nitrogen is supplied to the cathode.

In some embodiments of such methods, hydrogen (pure or diluted with an inert gas) is supplied to the anode flow path and an inert gas (e.g. nitrogen or helium) is supplied to the cathode flow path. A low flow rate of oxygen or air is also introduced into the cathode flow path so that there is a low concentration of oxygen in the inert gas supplied to the cathode path. There will generally tend to be a small amount of permeation of hydrogen across the membrane from anode to cathode. When the concentration of oxygen at the cathode is sufficiently low that (in the presence of the cathode catalyst) it is all consumed by reacting with hydrogen that is permeating through the membrane, the OCV will remain low. If the flow rate of oxygen or air to the cathode is increased so that more oxygen is being supplied than is being consumed, the presence of oxygen at the cathode will cause the OCV to sharply increase. For example, FIG. 4 shows the cell OCV (potential) as a function of air flow rate for air introduced into the cathode when hydrogen is being supplied to the anode and nitrogen is being supplied to the cathode. At air flow rates below about 3 sccm (standard cubic centimeters per minute) the potential remains low because all of the oxygen is being consumed at the cathode. The reaction between the hydrogen and oxygen causes activation losses which is likely what causes the potential to drop slightly, as shown in FIG. 4. Above an air flow rate of about 3 sccm, the potential jumps up dramatically because there is now oxygen present at the cathode, and the potential increases towards the expected ~1 V for a fuel cell being supplied with hydrogen at the anode and oxygen at the cathode. The air flow rate at which this voltage transition occurs in each individual cell depends on the flow rate of air/nitrogen actually reaching the cathode in each cell, as well as upon the amount of hydrogen permeation through the membrane from the anode. The amount of dip in the cell voltage prior to the transition, and the increase post-transition, depends on the effectiveness of the catalyst at the cathode. Therefore, among other things, methods involving this technique can be used to detect and locate problems with the catalyst and/or flow distribution issues in cells of a stack prior to break-in. Such problems are usually only uncovered during polarization and other electrochemical testing performed after break-in.

So, for example, if the cathode catalyst is not performing properly in one or more cells of a stack, it may be less effective in promoting the reaction of the small amount of hydrogen at the cathode with the oxygen introduced into the cathode, and the air flow-OCV profile for such cells at a particular air flow rate to the cathode will be different from the air flow-OCV profile of other cells (e.g. it may have a different shape or arc before and/or after the transition).

Similarly, if the nitrogen/air mixture is not actually reaching the cathode at the same rate in one or more cells of a stack relative to others (e.g. if access to a cathode is impeded due to a problem with the flow field plate, GDL or a blockage somewhere), the air flow rate at which the voltage transition occurs may be higher for such cells, and the problem cells can be identified based on their OCV compared to other cells at a particular air flow rate, or their air flow-OCV profile (e.g. the transition maybe shifted, occurring at a different air flow rate).

Because generally there is not much hydrogen permeation through the membrane, the potential is extremely sensitive to air flow rate (i.e. a very small increase in air flow rate can cause the voltage to jump up). In some embodiments of the test methods, a small flow rate of hydrogen can be introduced into the cathode flow (along with the nitrogen and air). This provides more hydrogen at the cathode and shifts the voltage transition to higher air flow rates. This can allow better differentiation between individual cells when looking at the OCV versus air flow rate.

Similar tests can be performed on the anode side of a fuel cell stack, by switching the gases around, e.g. supplying hydrogen to the cathode, nitrogen to the anode and introducing air into the nitrogen at a low flow rate, and optionally introducing a low flow rate of hydrogen at the anode.

These methods can also be adapted for electrolyzers. In some embodiments, different gas combinations may be used in the various flow paths, to account for the presence of non-precious metal (NPM) catalysts or catalysts that do not catalyze the reaction of hydrogen and oxygen.

Thus, test methods involving combining oxygen and hydrogen at the same electrode and measuring cell OCVs can be used to assess catalyst quality and detect other defects such as reactant flow distribution issues prior to break-in and without actually operating the stack. Because, the stack is not operating, the number of processes going on in the stack during the testing is much less than with conventional post-break-in testing, and it can be easier to identify and locate problems. For example, proton conduction across the membrane, generation of water, exothermic reactions, and other processes are not happening, or are happening to a much lesser extent than in an operating fuel cell stack.

Rapid, Parallel EOL Testing

As mentioned above, some of the pre-break-in EOL test methods described herein can be combined and run in parallel (or by making slight adjustments to test conditions during the testing) to enable efficient detection of multiple types of defects and faster overall EOL testing. For example, one can operate a fuel cell stack with an anode overpressure using low hydrogen concentration, to detect internal leaks and electrical shorts at the same time. If the coolant flow path is supplied with air or oxygen at an overpressure relative to the pressure at the anodes and cathodes, an internal leak between the coolant flow path and the anode and cathode can also be detected at the same time. If the anode and cathode and coolant flow paths are also pressurized and sealed (for example, using shutoff valves), external leaks can also be detected at the same time by observing the rate of pressure drop. Alternatively, helium can be used instead of nitrogen in the flow paths during EOL testing, and a helium sensor can be used outside the stack to detect external leaks at the same time as other testing is being performed. In this case, helium and oxygen will be supplied to the coolant, helium will be supplied to the cathode, and helium and hydrogen will be supplied to the anode.

Figure 5A:
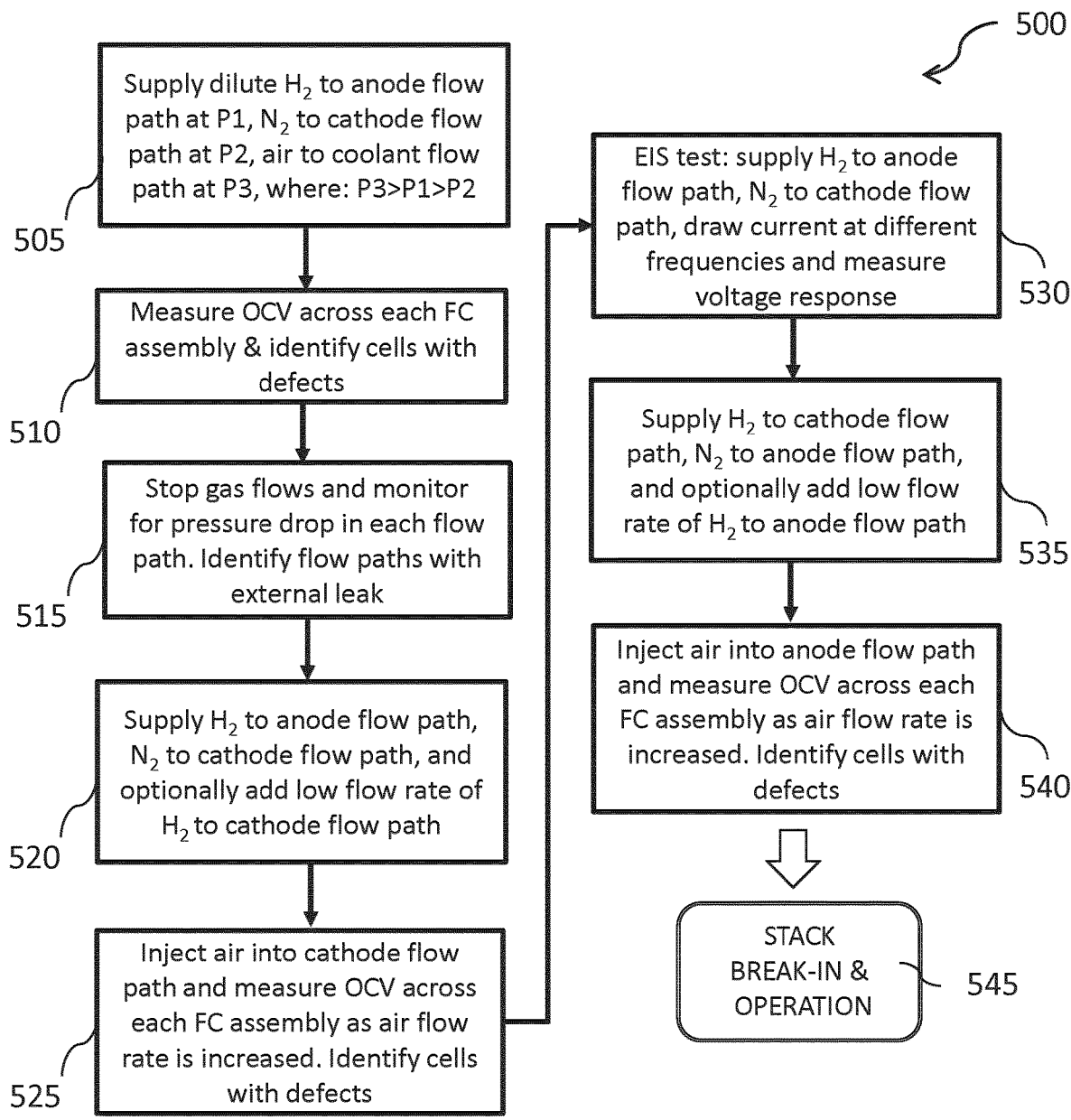

FIG. 5A is a flow chart illustrating such an embodiment of a method 500 that can be used to efficiently detect (and in some instances locate) multiple types of defects in a fuel cell stack at EOL and prior to break-in or operation of the stack, with some of the tests being performed in parallel.

Block 505 of method 500 comprises supplying a dilute hydrogen stream to flow through the anode flow path at a pressure P1, supplying nitrogen (or another inert gas) to flow through the cathode flow path at a pressure P2, and supplying air to flow through the coolant flow path of a fuel cell stack at a pressure P3. This technique can be used to detect electrical shorts as described above. In order to also allow simultaneous testing for internal leaks between the anode and cathode flow path, the pressures during this part of test method 500 can be set so that P1 is greater than P2, and in order to allow simultaneous testing for internal leaks between the coolant flow path and the anode and/or cathode flow paths, the pressures can be set so that P3 is greater than P2 and P1. For example, in some embodiments the anode flow path is supplied with 10% hydrogen in nitrogen at 0.5 NLPM and 130 kPA, the cathode flow path is supplied with nitrogen at 0.5 NLPM and 100 kPA, and the coolant flow path is supplied with air at 0.5 NLPM and 160 kPa.

Block 510 of method 500 comprises waiting until the voltages stabilize, and then measuring the open circuit voltage across each of the plurality of fuel cell assemblies in the stack. The OCV data can be used, for example, to identify cells with electrical shorts and/or to identify internal transfer leaks in the stack, for example by comparing the OCV data from the different cells and looking for outliers, as described elsewhere herein.

Block 515 of method 500 comprises stopping the supply of gases, shutting off or sealing the anode, cathode and coolant flow paths, and then monitoring the pressure in each flow path. A drop in pressure in a flow path over time can be used to detect an external leak from the flow path.

Block 520 of method 500 comprises supplying dilute hydrogen (e.g. as in block 505) or pure hydrogen to the anode flow path, supplying nitrogen to the cathode flow path, and optionally adding a low flow rate of hydrogen to the cathode flow path along with the nitrogen. Block 525 of method 500 comprises also supplying a low flow rate (e.g. 1 sccm) of air to the cathode flow path (along with the nitrogen and optionally some hydrogen). In block 525 the open circuit voltage across each of the plurality of fuel cell assemblies is measured as the flow rate of air to the cathode is increased. The OCV profile can be used to identify and locate defects in the stack, such as problems with the cathode catalyst and or flow distribution issues, as described elsewhere herein.

Block 530 comprises performing an optional hydrogen-nitrogen EIS test at low OCVs, in which hydrogen and nitrogen are again supplied to the anode and cathode flow paths, respectively, and a relatively small DC current is drawn superimposed by a small sinusoidal current. The voltage response is then measured for each cell. This EIS test is conveniently done before switching the gases supplied to the anode and cathode flow paths in block 535 to test and characterize the anode (in a similar manner as was done for the cathode in blocks 520 and 525).

For example, block 535 of method 500 comprises supplying dilute or pure hydrogen to the cathode flow path, supplying nitrogen to the anode flow path, and optionally providing a low flow rate of hydrogen to the anode flow path along with the nitrogen. Block 540 of method 500 comprises supplying a low flow rate (e.g. 1 sccm) of air to the anode flow path (along with the nitrogen and optionally some hydrogen), and measuring the open circuit voltage across each of the plurality of fuel cell assemblies as the flow rate of air to the anode is increased. The OCV profile can be used to identify and locate defects in the stack, such as problems with the anode catalyst and or flow distribution issues, as described elsewhere herein.

Method 500 illustrates how various elements of EOL testing can be performed in parallel, and in a convenient sequence, by making simple changes to the gases supplied as the method progresses.

If the stack fails any of the EOL tests, the method 500 may be stopped without all of the tests being completed. If the stack passes the tests satisfactorily then it may move on and be subjected to a stack break-in procedure and then power-producing operation, for example, as shown at block 560.

Figure 5B:
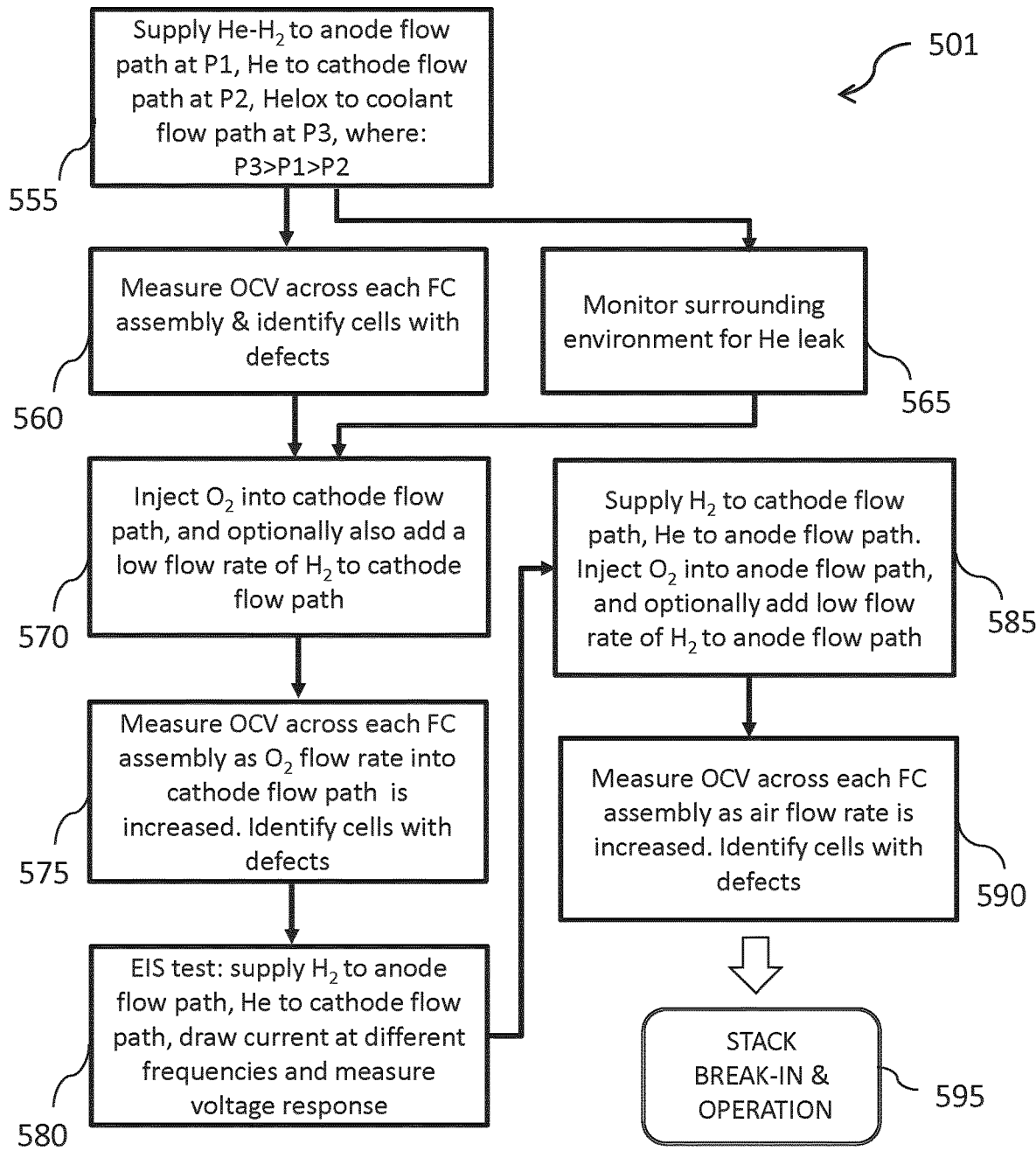

FIG. 5B is a flow chart illustrating another embodiment of a method 501 that can be used to efficiently detect (and in some instances locate) multiple types of defects in a fuel cell stack at EOL and prior to break-in or operation of the stack, with even more of the tests being performed in parallel.

Block 555 of method 501 comprises supplying a dilute hydrogen-helium stream to flow through the anode flow path at a pressure P1, supplying helium to flow through the cathode flow path at a pressure P2, and supplying oxygen to flow through the coolant flow path of a fuel cell stack at a pressure P3. During this part of test method 501 the pressures can be set so that P1 is greater than P2, and so that P3 is greater than P2 and P1 so that the methods can be used to test for internal leaks at the same time as testing for electrical shorts.

Block 560 of method 501 comprises waiting until the voltages stabilize, and then measuring the open circuit voltage across each of the plurality of fuel cell assemblies in the stack. The OCV data can be used, for example, to identify cells with electrical shorts and/or to identify internal transfer leaks in the stack, for example by comparing the OCV data from the different cells and looking for outliers.

By using helium in all three flow paths, if P1, P2 and P3 are all greater than the pressure outside the stack, then the environment surrounding the stack can be monitored using a helium sensor as in block 565. In this way, external leak testing can be performed in parallel with testing the stack for electrical shorts and internal leaks.

Then at block 570, while continuing to supply the same gases to the anode and cathode flow paths as in block 555, a low flow rate of oxygen is introduced into the cathode flow path (along with the helium), and optionally a low flow rate of hydrogen is also added to the cathode flow. In block 575 the open circuit voltage across each of the plurality of fuel cell assemblies is measured as the flow rate of oxygen to the cathode is increased. The OCV profile can be used to identify and locate defects in the stack, such as problems with the cathode catalyst and or flow distribution issues, as described elsewhere herein.

Block 580 comprises performing an optional hydrogen-nitrogen EIS test at low OCVs, in which hydrogen and helium continue to be supplied to the anode and cathode flow paths.

Block 585 of method 501 comprises supplying dilute or pure hydrogen to the cathode flow path, supplying helium to the anode flow path, introducing a low flow rate of oxygen to the anode flow path (along with the helium), and optionally adding a low flow rate of hydrogen to the anode flow path. Block 590 of method 501 comprises measuring the open circuit voltage across each of the plurality of fuel cell assemblies as the flow rate of oxygen to the anode is increased. The OCV profile can be used to identify and locate defects in the stack, such as problems with the anode catalyst and or flow distribution issues, as described elsewhere herein.

If the stack fails any of the EOL tests, the method 501 may be stopped without all of the tests being completed. If the stack passes the tests satisfactorily then it may move on and be subjected to a stack break-in procedure and then power-producing operation, for example, as shown at block 595.

Test Stations and Systems for Rapid EOL, Pre-Break-In Testing

Test stations that are designed specifically for EOL, pre-break-in ("cold") testing of fuel cell stacks and other electrochemical stacks can have some key differences from conventional test stations. For example, such test stations can be configured with gas sources, gas supply lines, mass flow controllers and valves etc. so that hydrogen, nitrogen or helium (or another inert gas), and oxygen or air (or mixtures of any of these gases) can be supplied to both the anode or cathode flow paths, and so that nitrogen or helium (or another inert gas), and oxygen or air (or mixtures of these gases) can be supplied to the coolant flow path (rather than water or a liquid coolant). Such test stations can be configured to deliver the gases to the stack without humidification or heating, so in some embodiments there is no humidification subsystem and/or no cooling/heating circuit, and associated control systems. Furthermore, in some embodiments there is no hardware for connecting an electrical load across a fuel cell stack, if the tests to be performed using such a test station do not involve operating the fuel cell stack to produce power. In some embodiments, for example if EOL EIS testing is to be performed (at low OCV), then the test station can comprise a small load that can be connected across a stack, and can comprise a mechanism for switching the polarity of the load.

Figure 6:
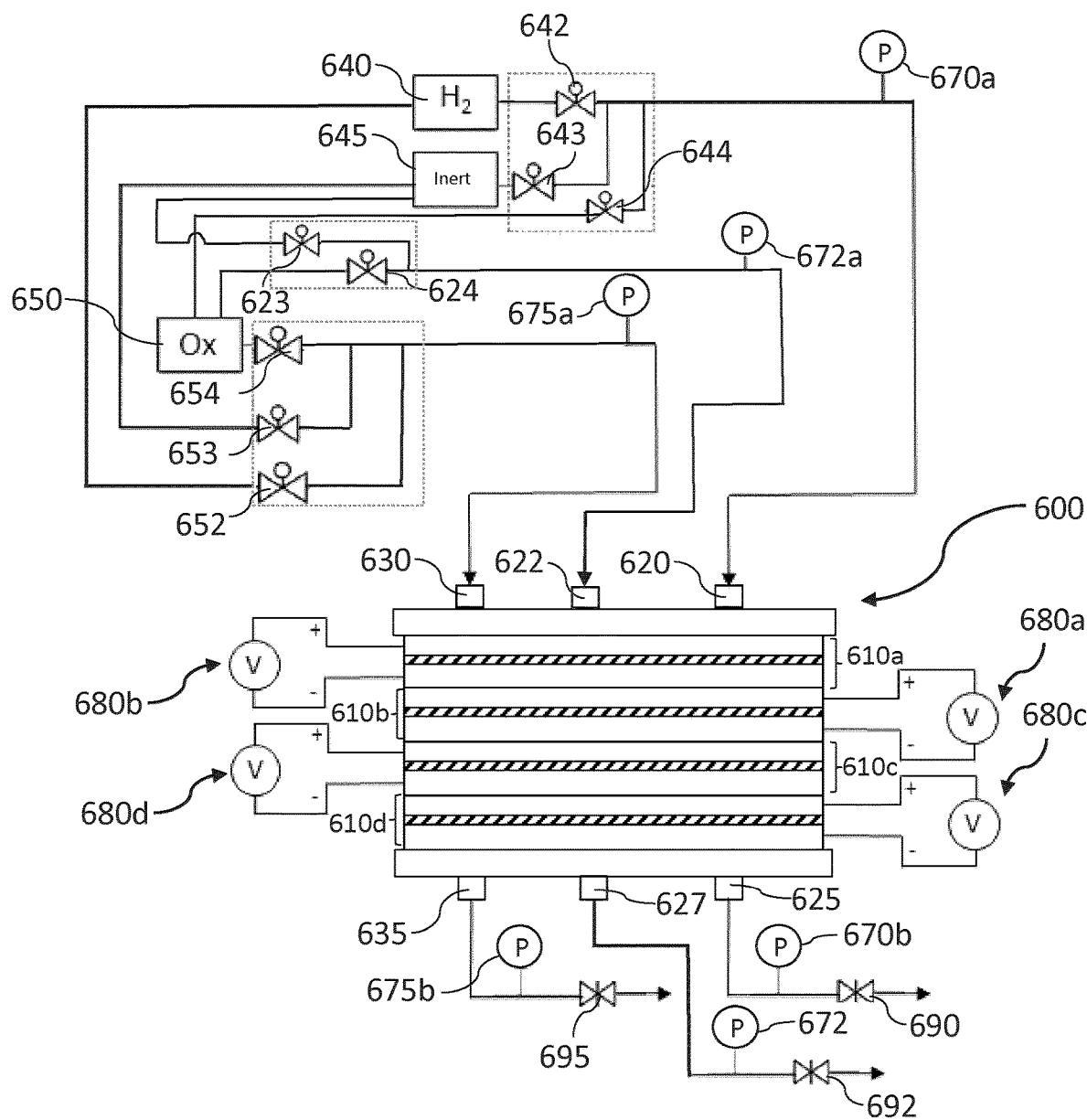
FIG. 6 is a schematic illustration of an embodiment of a test station that can be used to perform embodiments of the EOL test methods described herein, shown connected to a fuel cell stack.

FIG. 6 is a schematic illustration of an embodiment of a test station that can be used to perform embodiments of the test methods described herein for cold testing an electrochemical cell stack, such as a fuel cell stack or an electrolyzer stack. FIG. 6 shows a fuel cell stack 600 connected to the test station. Fuel cell stack 600 comprises four fuel cell assemblies 610a, 610b, 610c and 610d, each comprising an anode side, a cathode side, and a membrane electrolyte (shown with shading) therebetween. The anode side can comprise an anode electrode typically comprising a porous gas diffusion layer (GDL) and an anode catalyst layer between the GDL and the membrane electrolyte. Similarly, the cathode side can comprise a cathode electrode typically comprising a porous gas diffusion layer (GDL) and a cathode catalyst layer between the GDL and the membrane electrolyte. There is typically a flow field plate adjacent each of the anode and cathode GDLs for directing reactant streams to the anode and cathode respectively. In some fuel cell stacks the flow field plate between adjacent anode-cathode GDLs is a single bipolar plate with anode flow field channels on one side and cathode flow field channels on the other side, and in some cases a coolant flow field in between (e.g. inside the plate). In some fuel cell stacks there is a pair of flow field plates between each adjacent anode-cathode GDL pair, with anode flow field channels on one side of one plate (facing the anode GDL) and cathode flow field channels on one side of the other plate (facing the cathode GDL), and a coolant flow field between the plates. Fuel cell stack 600 also comprises an anode inlet port 620 and anode outlet port 625, a cathode inlet port 630 and a cathode outlet port 635, and a coolant inlet port 622 and a coolant outlet port 627.

Anode inlet port 620 is connected to source of hydrogen 640, to source of nitrogen (or helium, or other inert gas) 645, and to source of oxygen-containing gas 650 (e.g. an oxygen source, or air supplied via an air compressor or pump) via mass flow controllers (MFCs) 642, 643 and 644, respectively. MFCs 642, 643 and 644 can, for example, allow for selecting which gases are supplied, and for mixing of the gases and adjusting the concentration of hydrogen-containing gas and/or oxygen-containing gas supplied to the anodes of fuel cell stack 600, as desired.

Cathode inlet port 630 is connected to source of oxygen-containing gas 650 (e.g. an oxygen source, or air supplied via an air compressor or pump) via MFC 654. Cathode inlet port 630 is also connected to source of nitrogen (or helium or other inert gas) 645 via MFC 653, and to hydrogen source 640 via MFC 652. MFCs 652, 653 and 654 can, for example, allow for selecting which gases are supplied, and for mixing of the gases.

Coolant inlet port 622 is optionally connected to source of inert gas 645, and to a source of oxygen-containing gas 650 (e.g. an oxygen source, or air supplied via an air compressor or pump) via mass flow controllers (MFCs) 623 and 624, respectively. MFCs 623 and 624 can, for example, allow for the choice and/or mixing of gases supplied to the coolant flow path in fuel cell stack 600.

Pressure sensors 670a and 670b can be used to monitor pressure at the anode inlet and outlet, respectively. Pressure sensors 675a and 675b can be used to monitor pressure at the cathode inlet and outlet, respectively. Pressure sensors 672a and 672b can be used to monitor pressure at the coolant inlet and outlet, respectively.

Voltage measurement devices 680a, 680b, 680c and 680d are used to monitor or measure the voltage across fuel cell assemblies 610a, 610b, 610c and 610d, respectively. The voltmeters can be part of a cell voltage monitoring system (CVM), which is a typical component of a fuel cell test station.

Back pressure valves 690, and 695 can be used to control the pressure at the anode and cathode, respectively. Back pressure valve 692 can be used to control the pressure in the coolant flow path in fuel cell stack 600.

Figure 7:
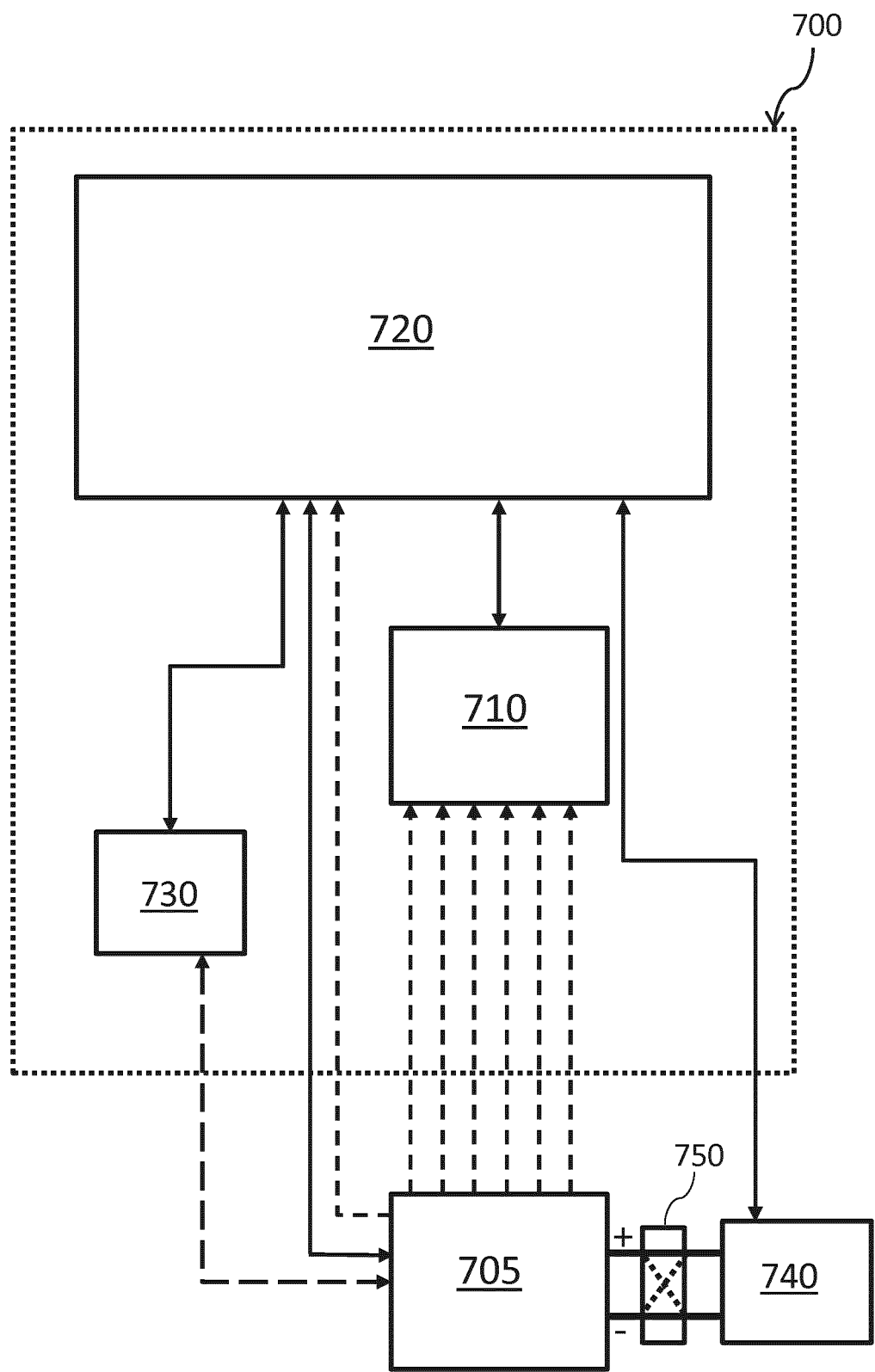
FIG. 7 is a schematic illustration of an embodiment of a test system that can be used to perform embodiments of the EOL test methods described herein.

FIG. 7 is a simplified schematic diagram of an embodiment of a system 700 that can be used to perform embodiments of the EOL test methods described herein, including to detect and locate problems in fuel cells in a fuel cell stack 705 prior to break-in. In FIG. 7, the long-dashed lines indicate process stream connections, thinner solid lines indicate measurement and control lines, heavy solid lines indicate electrical connections, and the short-dashed lines indicate measurement lines.

System 700 comprises a cell voltage monitoring subsystem 710, and a system controller, which in the illustrated embodiment is a supervisory control and data acquisition (SCADA) system 720. Cell voltage monitoring subsystem 710 can be used to measure the voltage of fuel cell assemblies (individual fuel cells or groups of fuel cells), in fuel cell stack 705. Depending on the tests that are to be performed using system 700, the system optionally comprises load 740 which can be connected across the terminals of fuel cell stack 705. System 700 can also optionally comprise a mechanism 750 for switching the polarity of the load. Various other subsystems can be connected to fuel cell stack 705, including, for example, gas supply subsystem 730 that handles the supply of gases (e.g. hydrogen, air or oxygen, and nitrogen or helium) to the anode and cathode sides of fuel cell stack 705 under controlled conditions (e.g. flow rate, pressure etc.). Gas supply subsystem 730, for example, can comprise various mass flow controllers, valves, back pressure controllers, mixing devices, and pressure and temperature sensors, such as for example, those illustrated in FIG. 6 in the supply lines for gases to the anode, cathode and coolant flow paths of a fuel cell stack. In other embodiments system 700 can be connected to and used to test an electrolyzer instead of fuel cell stack 705.

SCADA system 720 is connected and configured to control operation of subsystem 730, and also to control operation of cell voltage monitoring subsystem 710. SCADA system 720 can also receive data from sensors and other devices in subsystem 730, and from cell voltage monitoring subsystem 710. For example, SCADA system 720 can include a computer (e.g. a PC) running LabVIEW®-based software which communicates with IO hardware, instruments and sensors using software and control algorithms to control cell voltage monitoring subsystem 710 and subsystem 730, and to monitor fuel cell stack 705. Parameters controlled by SCADA system 720 may include, gas composition/concentration, anode/cathode pressures, gas inlet flow rates, for example. Parameters that are measured or monitored during testing of fuel cell stack 705 may include the controlled parameters (which are monitored or measured via suitable sensors and monitoring devices, for example) as well as cell voltages via cell voltage monitoring subsystem 710.

SCADA system 720 can be equipped to perform mathematical calculations and/or data analysis in real time. In some embodiments this is achieved, for example, by interfacing a LabVIEW®-based software module with MATLAB®. In this case, the LabVIEW®-based software module can collect data and control the subsystems, and the data can be passed to MATLAB® for further post processing, calculations and data/results output.

In the depicted embodiment, the system controller 720 comprises a processor that is communicatively coupled to a non-transitory computer readable medium. Computer program code that is executable by the processor can be stored on the computer readable medium. When executed by the processor, the computer program code can cause the processor (and consequently, the system controller) to perform any one or more of the embodiments of the methods described herein.

In other embodiments, the system controller may comprise one or more programmable logic controllers (PLCs), real-time embedded controllers (such as, for example, National Instruments CompactRIO™ platform), digital signal processors, field programmable gate arrays, or application-specific integrated circuits, which can take on aspects of the supervisory control of the system. One or more computers (e.g. PCs) can still be used to provide user interface and data acquisition capabilities. Examples of the computer readable medium are non-transitory and comprise disc-based media such as CD-ROMs and DVDs, magnetic media such as hard drives and other forms of magnetic disk storage, and semiconductor-based media such as flash media, random access memory, and read only memory.

Once one or more of the pre-break-in test methods as described herein have been performed, a fuel cell stack may be subjected to additional testing after break-in, for example, by the manufacturer or the customer/end-user. For example, more involved "hot and wet" testing under conditions that are closer to normal fuel cell operating conditions may be performed.

Example 1

Table 1 shows the result of testing a 10-cell PEM fuel cell stack, with an active area of 195 cm$^2$, for electrical short circuits prior to break-in. The stack was connected in a counter-flow configuration, and the testing was conducted at 30° C. and 0.1 kPag pressure at the anode and cathode. The gases were supplied without humidification.

TABLE 1

| H$_2$ (%) | R (Ω) | Cell # | Measured potentials (mV) | | | | | | | | | |
|---|---|---|---|---|---|---|---|---|---|---|---|---|
| | | | C0 | C1 | C2 | C3 | C4 | C5 | C6 | C7 | C8 | C9 |
| 100 | — | All | 93 | 93 | 92 | 92 | 92 | 93 | 93 | 92 | 91 | 92 |
| 100 | 10 | C8 | 93 | 93 | 91 | 92 | 92 | 92 | 92 | 92 | 91 | 91 |
| 100 | 0.8 | C4 | 93 | 93 | 91 | 92 | 86 | 92 | 93 | 92 | 91 | 92 |
| 100 | 0.1 | C1 | 93 | 81 | 91 | 92 | 86 | 92 | 92 | 91 | 91 | 92 |
| 10 | 0.1 | C1 | 87 | 55 | 85 | 85 | 62 | 88 | 88 | 86 | 80 | 86 |

The results shown in the first row of Table 1 show the potential (OCV) measured for each of the individual fuel cells (cells C0 to C9) when substantially pure hydrogen was supplied to the anodes and nitrogen was supplied to the cathodes, prior to adding any external electrically conductive path across any of the cells to simulate an electrical short circuit. It can be seen in the first row of Table 1 that the measured potential for all of the cells was within a 2 mV range.

The second row of Table 1 shows the cell potentials when a 10Ω resistance was connected across cell C8 (to simulate a small electrical short circuit), and when substantially pure hydrogen was supplied to the anodes and nitrogen was supplied to the cathodes. This resistance was not detectable based on the observed measured potential values under these conditions, as the potential of cell C8 did not change. The third row of Table 1 shows the cell potentials when an additional 0.8Ω resistance was connected across cell C4 (to simulate a more significant short circuit)—again with substantially pure hydrogen supplied to the anodes and nitrogen supplied to the cathodes. In this case, the potential of cell C4 dropped by 6 mV, rendering the simulated electrical short circuit detectable, whereas the other cell potentials did not change by more than 1 mV. By looking at the third row alone it is possible to identify cell C4 as having an electrical short circuit. The fourth row of Table 1 shows the cell potentials when an additional 0.1Ω resistance was connected across cell C1 (to simulate an even more substantial electrical short circuit)—again with substantially pure hydrogen supplied to the anodes and nitrogen supplied to the cathodes. This resulted in a 12 mV drop in cell potential for cell C1.

The fifth row of Table 1 show the measured cell potentials for cells C0-9 with the same resistances connected across cells C1 (0.1Ω), C4 (0.8Ω) and C8 (10Ω) to simulate different electrical short circuits, but with the hydrogen supplied to the anodes diluted with nitrogen so that the molar fraction of hydrogen was reduced to 10%. With the reduced hydrogen molar fraction of 10%, the simulated electrical short circuits on each of cells C1, C4 and C8 were detectable using the method, as they all deviated by more than 4 mV from the potentials of the "defect-free" cells. Even the 10Ω resistance connected across cell C8 to simulate a short circuit was readily detected when the test was performed using the lower hydrogen concentration. Thus, reducing the hydrogen concentration increased the sensitivity of the method to differentiate fuel cells that have an electrical short circuit from those that do not, based on their lower OCV.

Thus, it is possible to use a hydrogen molar fraction that has been calibrated for the magnitude of electrical short (or its resistance) that needs to be detected, and then to detect cells with an electrical short by a single measurement based on the observed cell potential.

Example 2

In this example illustrates simultaneous (or parallel) testing of a fuel cell stack for electrical shorts and internal leaks using embodiments of systems and methods described herein. A short 3-cell PEM fuel cell stack was constructed using a brand new MEA in Cell #1, a previously conditioned MEA in Cell #2, and an MEA with a pinhole in it for Cell #3. A 10Ω resistance was connected across Cell #1 to simulate an electrical short. Hydrogen was supplied to the anode flow path under three different conditions and, in each case, nitrogen was supplied to the cathode flow path. Firstly, substantially pure hydrogen was supplied to the anode flow path with no overpressure, and the OCV of each cell was measured. Secondly, substantially pure hydrogen was supplied to the anode flow path with an overpressure of 20 kPa (relative to the pressure of nitrogen at the cathodes), and the OCV of each cell was measured. Then, nitrogen was used to dilute the hydrogen supplied to the anodes to a mole fraction of 10% (with no overpressure), and the OCV of each cell was measured.

TABLE 2

| $H_2$ concentration | 100% | 100% | 10% |
|---|---|---|---|
| $H_2$ overpressure | 0 KPA | 20 kPa | 0 kPa |
| Cell #1 (mV) | 96 | 97 | 76 |
| Cell #2 (mV) | 95 | 95 | 92 |
| Cell #3 (mV) | 75 | 49 | 100 |

Table 2 shows the results of this testing. Comparing the individual cell OCVs, it can be seen that with 100% hydrogen and no overpressure, Cell #1 and Cell #2 have similar OCVs, whereas the OCV of Cell #3 is lower. This suggests that Cell #3 has a defect, but does not indicate whether Cell #3 has an internal leak or an electrical short. When the hydrogen pressure is increased so that there is a 20 kPA overpressure, the OCV of Cell 3 drops significantly, whereas the OCVs of Cells #1 and #2 do not change much. This suggests that Cell #3 has a transfer leak with hydrogen passing through the membrane from anode to cathode. With a drop in hydrogen concentration supplied to the anode (to a mole fraction of 10% hydrogen in nitrogen) and no overpressure, the OCV of Cell 1 dropped relative to the OCV obtained using substantially pure hydrogen, indicating the presence of an electrical short across Cell #1. This example illustrates that informative testing can be performed without operating the fuel cell stack to produce electrical power. Also, simply by changing the hydrogen overpressure and mole fraction and comparing the OCV measurements, it is possible to identify and locate which cells are suffering from transfer leaks or electrical shorts.

Embodiments of the systems and methods described herein can be used for testing fuel cell stacks, and much of the description relates to testing PEM fuel cell stacks designed for operation on air or oxygen and hydrogen. However the approach, systems and methods described herein can be used or adapted for other types of electrochemical cell assemblies and stacks, including for example, for testing PEM fuel cell assemblies and stacks operating on other reactants, solid oxide fuel cell (SOFC) assemblies and stacks, and electrolyzers such as PEM or solid oxide electrolyzer assemblies and stacks.

As used herein, "fuel" means a substantially pure hydrogen gas stream or a gas stream comprising hydrogen (such as a reformate gas stream) or another fuel, for example. As used herein, "oxidant" means a substantially pure oxygen gas stream or a gas stream comprising oxygen, such as air, for example.

"Inert gas" means a gas stream that is substantially unreactive in an electrochemical cell, such as nitrogen, argon, or helium, or any combination thereof in a fuel cell, for example.

"Reactant" is used to refer to a material that is reactive in an electrochemical cell, either in testing and/or in operation of the cell, such as hydrogen or oxygen in a fuel cell, for example.

An "electrical short circuit" or "electrical short" is used to refer to an electrical circuit that allows an electric current to travel along an unintended path, for example between two nodes of an electric circuit that are intended to be at different voltages. In particular, in this description and appended claims, the term is used primarily to refer to an unintended electron-conducting path between the anode and cathode sides of an individual electrochemical cell.

An "internal leak" is used to refer to a condition where reactants may mix with each other or with coolant within an electrochemical cell assembly or stack during normal operation due to a defect, for example, in membrane, an MEA, a flow field plate, and/or the seals therebetween in a fuel cell. This includes a leak between the anode side and the cathode side which can cause fuel and oxidant to mix. Typical sources of internal leaks include, for example, a pin-hole in the membrane electrolyte causing a transfer leak from one electrode to the other across the membrane, or a cracked fuel-oxidant bipolar flow field plate.

An "external leak" is used to refer to a leak of reactant and/or coolant from a fuel cell assembly or stack (or other electrochemical assembly or stack) to the surrounding environment.

Open circuit voltage ("OCV") is used to refer to the voltage across a fuel cell assembly (or other electrochemical assembly) when a first reactant is supplied to the anode side and a second reactant is supplied to the cathode side of a the assembly, or when a first reactant is supplied to the anode or cathode side and an inert gas is supplied to the other side of the assembly, but no external electrical load is connected across the assembly.

Some acts of the methods (also referred to as blocks, elements or steps of the methods) may be performed in an order other than that which is described and illustrated herein, or may be performed in parallel with one or more other acts, or maybe be combined with one or more other acts. To the extent that some of the acts rely on the completion of other acts of the method, these may need to be performed in a particular sequence.

It is contemplated that part of any aspect or embodiment discussed in this specification can be implemented or combined with part of other aspects or embodiments discussed in this specification.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

The invention claimed is:

1. A method for end-of-line testing of a fuel cell stack, said fuel cell stack comprising:
   a plurality of fuel cell assemblies;
   an anode inlet port, an anode outlet port, and an anode flow path passing through each of said plurality of fuel cell assemblies and fluidly connecting said anode inlet port to said anode outlet port within said fuel cell stack;
   a cathode inlet port, a cathode outlet port and a cathode flow path passing through each of said plurality of fuel cell assemblies and fluidly connecting said cathode inlet port to said cathode outlet port within said fuel cell stack;
   said method comprising, before break-in of said fuel cell stack
   supplying a hydrogen-containing gas stream to flow through said anode flow path;
   supplying an inert gas stream to flow through said cathode flow path;
   measuring a first open circuit voltage across each of said plurality of fuel cell assemblies in said fuel cell stack while said hydrogen-containing gas stream and said inert gas stream are flowing through said anode and cathode flow paths, respectively;
   comparing said measured first open circuit voltages with one another or with a reference voltage to identify which, if any, of said plurality of fuel cell assemblies in said fuel cell stack has a defect;

and wherein each of said hydrogen-containing gas stream and said inert gas stream comprises helium, and each of said hydrogen-containing gas stream and said inert gas stream are supplied to said stack at a pressure greater than an ambient pressure surrounding said fuel cell stack, and said method further comprises testing for external leaks from said fuel cell stack by monitoring an environment surrounding said fuel cell stack for the presence of helium using a helium sensor;

or wherein said hydrogen-containing gas stream is supplied to flow through said anode flow path at a first pressure, and said inert gas stream is supplied to flow through said cathode flow path at a second pressure, said first pressure greater than said second pressure; and wherein said fuel cell stack further comprises a coolant inlet port, a coolant outlet port and a coolant flow path fluidly connecting said coolant inlet port to said coolant outlet port within said fuel cell stack; and wherein said method further comprises:

supplying an oxygen-containing gas stream to flow through said coolant flow path at a third pressure, wherein said third pressure is greater than said first pressure and said second pressure; and measuring said first open circuit voltage across each of said plurality of fuel cell assemblies in said fuel cell stack while said hydrogen-containing gas stream, said inert gas stream and said oxygen-containing gas stream are flowing through said anode, cathode and coolant flow paths, respectively;

or wherein said method further comprises, after measuring said first open circuit voltages:

supplying a second hydrogen-containing gas stream to flow through said anode flow path;

supplying an inert gas stream to flow through said cathode flow path;

introducing oxygen into said inert gas stream flowing through said cathode flow path;

while supplying said second hydrogen-containing gas stream to flow through said anode flow path and gradually increasing a concentration of oxygen in said inert gas stream flowing through said cathode flow path, measuring a plurality of open circuit voltages across each of said plurality of fuel cell assemblies in said fuel cell stack to acquire an open-circuit-voltage-versus-cathode-oxygen-concentration profile for each of said plurality of fuel cell assemblies in said fuel cell stack; and comparing said open-circuit-voltage-versus-cathode-oxygen-concentration profiles with one another or with a reference profile to identify which, if any, of said plurality of fuel cell assemblies in said fuel cell stack has a defect.

2. The method of claim 1 wherein said hydrogen-containing gas stream is a hydrogen diluted in an inert gas.

3. The method of claim 1 wherein each of said hydrogen-containing gas stream, and said inert gas stream comprises helium, and each of said hydrogen-containing gas stream and said inert gas stream are supplied to said stack at a pressure greater than said ambient pressure surrounding said fuel cell stack; and said method comprises testing for external leaks from said fuel cell stack by monitoring said environment surrounding said fuel cell stack for the presence of helium using a said helium sensor.

4. The method of claim 3 wherein said hydrogen-containing gas stream is supplied to flow through said anode flow path at a first pressure, and said inert gas stream is supplied to flow through said cathode flow path at a second pressure, said first pressure greater than said second pressure.

5. The method of claim 1 wherein:

said hydrogen-containing gas stream is supplied to flow through said anode flow path at said first pressure, and said inert gas stream is supplied to flow through said cathode flow path at said second pressure, said first pressure greater than said second pressure; and said fuel cell stack further comprises said coolant inlet port, said coolant outlet port and said coolant flow path fluidly connecting said coolant inlet port to said coolant outlet port within said fuel cell stack;

and said method comprises:

supplying an oxygen-containing gas stream to flow through said coolant flow path at said third pressure, wherein said third pressure is greater than said first pressure and said second pressure; and measuring said first open circuit voltage across each of said plurality of fuel cell assemblies in said fuel cell stack while said hydrogen-containing gas stream, said inert gas stream and said oxygen-containing gas stream are flowing through said anode, cathode and coolant flow paths, respectively.

6. The method of claim 5 wherein said first, second and third pressures are all greater than an ambient pressure surrounding said fuel cell stack, and said method further comprises, after measuring said first open circuit voltages:

shutting off said anode, cathode and coolant flow paths to contain their respective pressurized gas streams, and monitoring pressure in each of said flow paths over a period of time to detect if there is a leak from any of said flow paths.

7. The method of claim 5 wherein each of said hydrogen-containing gas stream, said inert gas stream and said oxygen-containing gas stream comprises helium, and each of said hydrogen-containing gas stream, said inert gas stream and said oxygen-containing gas stream are supplied to said stack at a pressure greater than an ambient pressure surrounding said fuel cell stack, and said method further comprises testing for external leaks from said fuel cell stack by monitoring an environment surrounding said fuel cell stack for the presence of helium using a helium sensor.

8. The method of claim 7 wherein said hydrogen-containing gas stream is a hydrogen diluted in helium, said method further comprising, after measuring said first open circuit voltages:

supplying said hydrogen-containing gas stream to flow through said anode flow path;

supplying helium to flow through said cathode flow path;

introducing oxygen into said helium flowing through said cathode flow path;

while supplying said hydrogen-containing gas stream to flow through said anode flow path and gradually increasing a concentration of oxygen in said helium flowing through said cathode flow path, measuring a plurality of open circuit voltages across each of said plurality of fuel cell assemblies in said fuel cell stack to acquire an open-circuit-voltage-versus-cathode-oxygen-concentration profile for each of said plurality of fuel cell assemblies in said fuel cell stack;

comparing said open-circuit-voltage-versus-cathode-oxygen-concentration profiles with one another or with a reference profile to identify which, if any, of said plurality of fuel cell assemblies in said fuel cell stack has a defect.

9. The method of claim 1 comprising, after measuring said first open circuit voltages:
supplying said second hydrogen-containing gas stream to flow through said anode flow path;
supplying an inert gas stream to flow through said cathode flow path;
introducing oxygen into said inert gas stream flowing through said cathode flow path;
while supplying said second hydrogen-containing gas stream to flow through said anode flow path and gradually increasing a concentration of oxygen in said inert gas stream flowing through said cathode flow path, measuring a plurality of open circuit voltages across each of said plurality of fuel cell assemblies in said fuel cell stack to acquire said open-circuit-voltage-versus-cathode-oxygen-concentration profile for each of said plurality of fuel cell assemblies in said fuel cell stack; and
comparing said open-circuit-voltage-versus-cathode-oxygen-concentration profiles with one another or with said reference profile to identify which, if any, of said plurality of fuel cell assemblies in said fuel cell stack has a defect.

10. The method of claim 8 further comprising also introducing a low concentration of hydrogen into said inert gas stream flowing through said cathode flow path while acquiring said open-circuit-voltage-versus-cathode-oxygen-concentration profiles.

11. The method of claim 8 further comprising, after acquiring said open-circuit-voltage-versus-cathode-oxygen-concentration profiles:
supplying a third hydrogen-containing gas stream to flow through said cathode flow path;
supplying an inert gas stream to flow through said anode flow path;
introducing oxygen into said inert gas stream flowing through said anode flow path;
while supplying said third hydrogen-containing gas stream to flow through said cathode flow path and gradually increasing a concentration of oxygen in said inert gas stream flowing through said anode flow path, measuring a plurality of open circuit voltages across each of said plurality of fuel cell assemblies in said fuel cell stack to acquire an open-circuit-voltage-versus-anode-oxygen-concentration profile for each of said plurality of fuel cell assemblies in said fuel cell stack;
comparing said open-circuit-voltage-versus-anode-oxygen-concentration profiles with one another or with a reference profile to identify which, if any, of said plurality of fuel cell assemblies in said fuel cell stack has a defect.

12. The method of claim 1 wherein said inert gas is selected from the group consisting of nitrogen, argon, and helium.

13. A test station for testing an electrochemical stack, said test station comprising:
a gas supply subsystem comprising a hydrogen-containing gas supply, an inert gas supply, and an oxygen-containing gas supply;
a cell voltage monitoring subsystem for measuring voltage across each of a first plurality of electrochemical cell assemblies;
a controller, said controller communicatively coupled to said cell voltage monitoring subsystem and configured to control said cell voltage monitoring system, and communicatively coupled to said gas supply subsystem and configured to control supply of gases to an electrochemical stack from said gas supply subsystem;
wherein said gas supply subsystem is configured:
for selectively delivering unhumidified gas from said hydrogen-containing gas supply, said inert gas supply, and said oxygen-containing gas supply to a first stack supply line;
for selectively delivering unhumidified gas from said hydrogen-containing gas supply, said inert gas supply, and said oxygen-containing gas supply to a second stack supply line: and
for selectively delivering gas from said oxygen-containing gas supply to a third stack supply line.

14. The test station of claim 13 wherein said gas supply subsystem is configured for also selectively delivering gas from said inert gas supply to said third stack supply line.

15. The test station of claim 13 wherein:
said first stack supply line is for delivering unhumidified gas to a first flow path in an electrochemical stack, and said first stack supply line is fluidly connected to receive gas from said hydrogen-containing gas supply via a first flow control device, fluidly connected to receive gas from said inert gas supply via a second flow control device, and fluidly connected to receive gas from said oxygen-containing gas supply via a third flow control device;
said second stack supply line is for delivering unhumidified gas to a second flow path in an electrochemical stack, and said second stack supply line is fluidly connected to receive gas from said hydrogen-containing gas supply via a fourth flow control device, fluidly connected to receive gas from said inert gas supply via a fifth flow control device, and fluidly connected to receive gas from said oxygen-containing gas supply via a sixth flow control device;
said third stack supply line is for delivering gas to a third flow path in an electrochemical stack, and said third stack supply line is fluidly connected to receive gas from said oxygen-containing gas supply via a seventh flow control device.

16. The test station of claim 13 wherein said first stack supply line is for delivering gas to an anode flow path in an electrochemical stack, said second stack supply line is for delivering gas to a cathode flow path in an electrochemical stack, and said third stack supply line is for delivering gas to a coolant flow path in an electrochemical stack.

17. The test station of claim 13 wherein said test station does not comprise a humidifier for humidifying a gas, nor a cooling/heating circuit for controlling a temperature of an electrochemical stack.

18. A supervisory control and data acquisition system comprising:
a cell voltage monitoring subsystem for measuring voltage across each of a plurality of fuel cell assemblies in a fuel cell stack, said fuel cell stack comprising an anode flow path and a cathode flow path;
a controller communicatively coupled to said cell voltage monitoring subsystem, wherein said controller is configured:
to cause a hydrogen-containing gas stream to flow through said anode flow path;
to cause an inert gas stream to flow through said cathode flow path;
to cause said cell voltage monitoring subsystem to measure a first open circuit voltage across each of said plurality of fuel cell assemblies while said hydrogen-containing gas stream and said inert gas stream are flowing through said anode and cathode flow paths, respectively; and to compare said measured first open circuit voltages with one another or with a reference voltage to identify which, if any, of said plurality of fuel cell assemblies in said fuel cell stack has a defect.

19. The supervisory control and data acquisition system of claim 18 wherein said controller is further configured:

to cause said hydrogen-containing gas stream to flow through said anode flow path at a first pressure;

to cause said inert gas stream to flow through said cathode flow path at a second pressure, said first pressure greater than said second pressure;

to cause an oxygen-containing gas stream to flow through a coolant flow path of said stack at a third pressure, said third pressure greater than said first pressure and said second pressure; and to cause said cell voltage monitoring subsystem to measure said first open circuit voltages while said hydrogen-containing gas stream, said inert gas stream and said oxygen-containing gas stream are flowing through said anode, cathode and coolant flow paths, respectively.

20. The supervisory control and data acquisition system of claim 18 wherein, after causing said cell voltage monitoring subsystem to measure said first open circuit voltages, said controller is configured:

to cause a second hydrogen-containing gas stream to flow through said anode flow path;

to cause an inert gas stream to flow through said cathode flow path;

to cause oxygen to be introduced into said inert gas stream flowing through said cathode flow path;

to cause a concentration of oxygen in said inert gas stream flowing through said cathode flow path to increase, and while supplying said second hydrogen-containing gas stream to flow through said anode flow path and gradually increasing a concentration of oxygen in said inert gas stream flowing through said cathode flow path, to cause said cell voltage monitoring subsystem to measure a plurality of open circuit voltages across each of said plurality of fuel cell assemblies in said fuel cell stack;

to cause said data acquisition system acquire an open-circuit-voltage-versus-cathode-oxygen-concentration profile for each of said plurality of fuel cell assemblies in said fuel cell stack, each said profile comprising said plurality of open circuit voltages for each said fuel cell assembly;

to compare said open-circuit-voltage-versus-cathode-oxygen-concentration profiles with one another or with a reference profile to identify which, if any, of said plurality of fuel cell assemblies in said fuel cell stack has a defect.

* * * * *